United States Patent
Kawahara et al.

(10) Patent No.: US 6,526,224 B1
(45) Date of Patent: Feb. 25, 2003

(54) DIGITAL VIDEO SIGNAL PROCESSING APPARATUS AND METHOD THEREOF, AND DIGITAL VIDEO SIGNAL REPRODUCING APPARATUS

(75) Inventors: Minoru Kawahara, Kanagawa (JP); Kenji Yamasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/223,815

(22) Filed: Dec. 31, 1998

(30) Foreign Application Priority Data

Jan. 5, 1998 (JP) .......................... 10-000121

(51) Int. Cl.$^7$ ................................ H04N 7/26
(52) U.S. Cl. ...................... 386/111; 386/124
(58) Field of Search ............. 386/27, 40, 111, 386/112, 124; 348/500, 511, 512, 516, 521, 525

(56) References Cited

U.S. PATENT DOCUMENTS

| | | | | |
|---|---|---|---|---|
| 5,341,250 A | * | 8/1994 | Uchida et al. ............. | 360/48 |
| 5,532,837 A | * | 7/1996 | Ootaka et al. ............ | 386/112 |
| 5,581,360 A | * | 12/1996 | Matsumura et al. ....... | 386/46 |
| 5,627,935 A | * | 5/1997 | Kim ......................... | 386/81 |
| 5,699,475 A | * | 12/1997 | Oguro et al. .............. | 386/109 |
| 5,724,097 A | * | 3/1998 | Hibi et al. ................ | 348/405 |
| 5,729,647 A | * | 3/1998 | Kim ......................... | 386/46 |
| 5,852,706 A | * | 12/1998 | Ogikubo et al. ........... | 386/111 |
| 5,905,840 A | * | 5/1999 | Ohtani ..................... | 386/44 |
| 5,923,813 A | * | 7/1999 | Okamoto et al. .......... | 386/109 |
| 6,348,945 B1 | * | 2/2002 | Hayakawa ................ | 348/240.18 |

* cited by examiner

*Primary Examiner*—Andrew Christensen
*Assistant Examiner*—Polin Chieu
(74) *Attorney, Agent, or Firm*—Jay H. Maioli

(57) ABSTRACT

In a packing unit (PU) composed of five sync blocks, Discrete Cosign Transform (DCT) blocks of compressed and encoded data are packed to a sync block. When same DCT blocks are not placed in a sync block, the remaining DCT blocks are temporarily placed in another sync block. In a high speed reproducing mode, a detecting portion detects whether or not the current PU mixes with data of another PU. The detected result is supplied as a flag to an unpacking portion along with a sync block. The unpacking portion removes a sync block that mixes with data of another PU. The unpacked data is supplied to a Bit Rate Reduction (BRR) decoder. The BRR decoder performs a decompressing process.

10 Claims, 26 Drawing Sheets

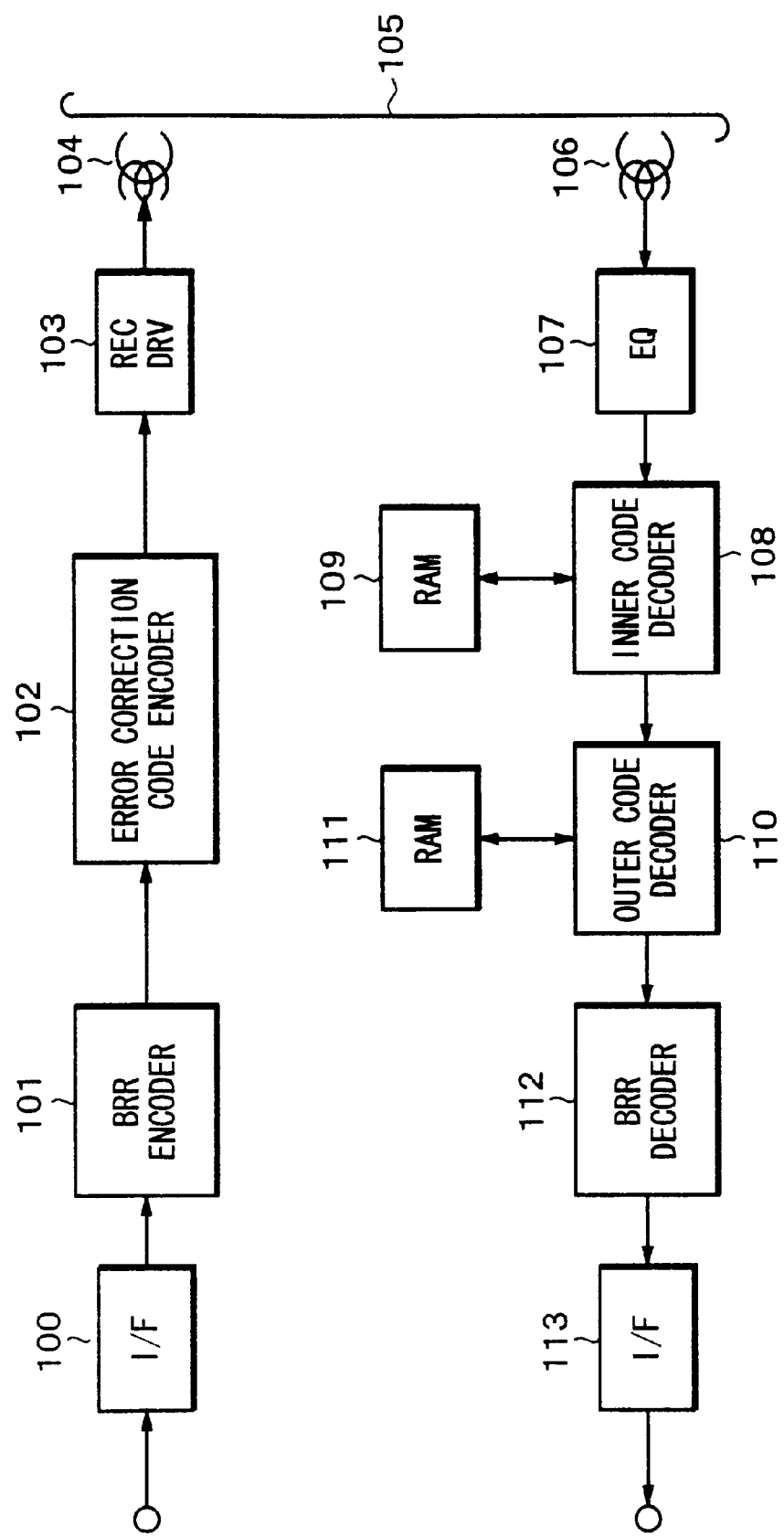

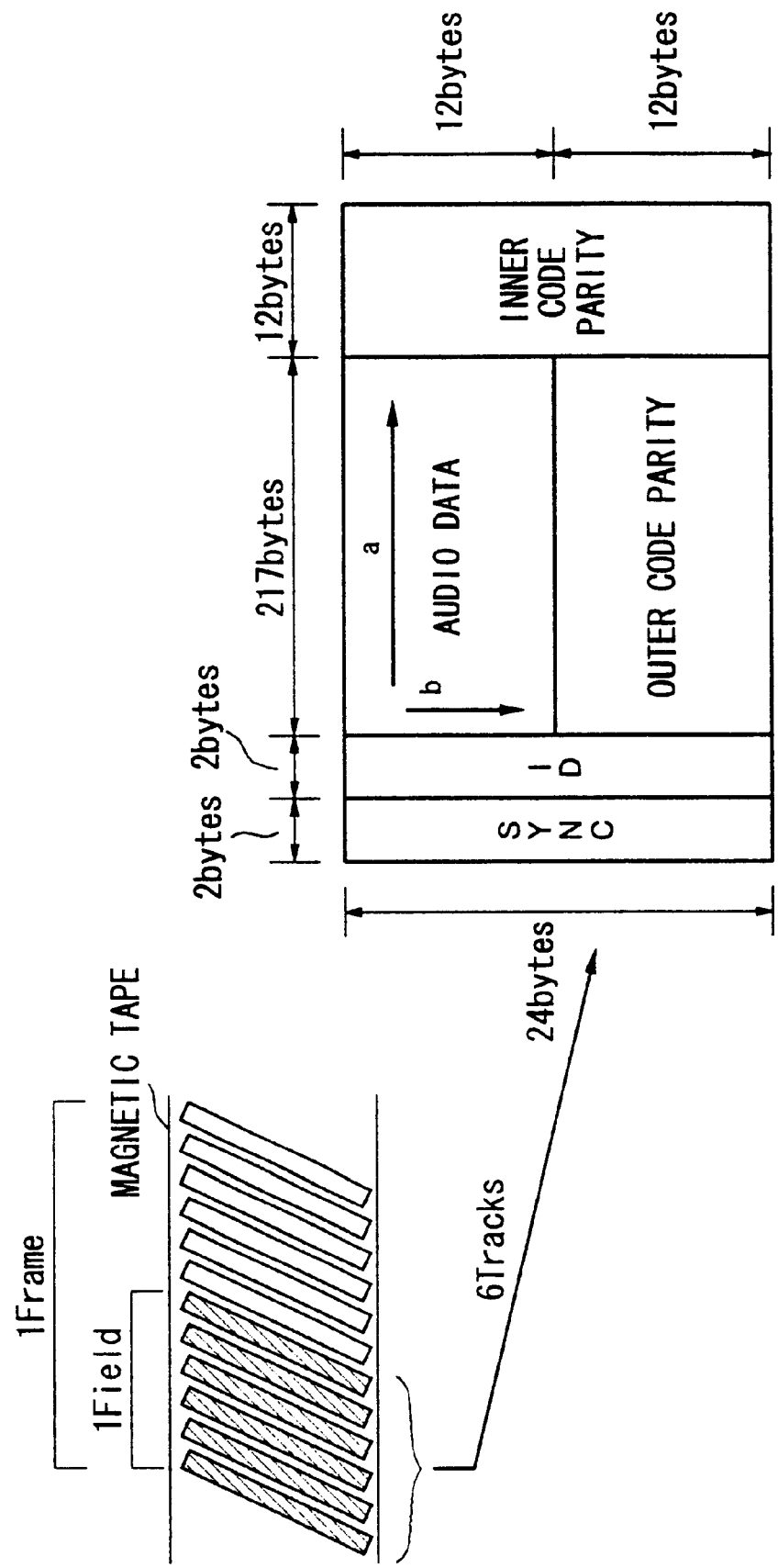

Fig. 17

| bit0 | bit15 |
|---|---|
| ID0 | ID0 |
| Data 0 | Data 1 |
| Data 2 | Data 3 |
| Data 4 | Data 5 |
| ⋮ | ⋮ |
| Data 212 | Data 213 |
| Data 214 | Data 215 |
| Data 216 | ID2 |
| EF | RCount |
| CRCC | PID0 |

122bytes

Fig. 18

| bit | VIDEO | AUDIO |
|---|---|---|
| (MSB) 10 | Segment 0~5 | 6 |
| 9 | | |
| 8 | | |
| 7 | FORWARD TRAVELING: 0 | 0 |
| 6 | REVERSE TRAVELING: 1 | |
| 5 | Sync Block No. B7~B2 | Field 0~3 |
| 4 | | |
| 3 | | CH 1~4 |
| 2 | | |
| 1 | | Sync Block No. B3, B2 |
| (LSB) 0 | | |

Fig. 19

| BANK A | | |
|---|---|---|
| S0-ID0 | S0-ID1 | 0 |
| S1-ID0 | S1-ID1 | 1 |
| S2-ID0 | S2-ID1 | 2 |
| S3-ID0 | S3-ID1 | 3 |
| S0-Data 0 | S0-Data 1 | 4 |
| S1-Data 0 | S1-Data 1 | 5 |
| S2-Data 0 | S2-Data 1 | 6 |
| S3-Data 0 | S3-Data 1 | 7 |
| S0-Data 2 | S0-Data 3 | 8 |
| S1-Data 2 | S1-Data 3 | 9 |
| S2-Data 2 | S2-Data 3 | 10 |
| S3-Data 2 | S3-Data 3 | 11 |
| ⋮ | ⋮ | ⋮ |
| S0-Data 108 | S0-Data 109 | 220 |
| S1-Data 108 | S1-Data 109 | 221 |
| S2-Data 108 | S2-Data 109 | 222 |
| S3-Data 108 | S3-Data 109 | 223 |
| S0-Err0~15 | | 224 |
| S1-Err0~15 | | 225 |
| S2-Err0~15 | | 226 |
| S3-Err0~15 | | 227 |
| ⋮ | | ⋮ |
| S0-Err96~111 | | 248 |
| S1-Err96~111 | | 249 |
| S2-Err96~111 | | 250 |
| S3-Err96~111 | | 251 |

| BANK B | | |
|---|---|---|
| S0-Data 110 | S0-Data 111 | 0 |
| S1-Data 110 | S1-Data 111 | 1 |
| S2-Data 110 | S2-Data 111 | 2 |
| S3-Data 110 | S3-Data 111 | 3 |
| S0-Data 112 | S0-Data 113 | 4 |
| S1-Data 112 | S1-Data 113 | 5 |
| S2-Data 112 | S2-Data 113 | 6 |
| S3-Data 112 | S3-Data 113 | 7 |
| S0-Data 114 | S0-Data 115 | 8 |
| S1-Data 114 | S1-Data 115 | 9 |
| S2-Data 114 | S2-Data 115 | 10 |
| S3-Data 114 | S3-Data 115 | 11 |
| ⋮ | ⋮ | ⋮ |
| S0-Data 216 | S0-ID2 | 220 |
| S1-Data 216 | S1-ID2 | 221 |
| S2-Data 216 | S2-ID2 | 222 |
| S3-Data 216 | S3-ID2 | 223 |
| S0-Err112~117 | | 224 |
| S1-Err112~117 | | 225 |
| S2-Err112~117 | | 226 |
| S3-Err112~117 | | 227 |
| ⋮ | | ⋮ |
| S0-Err208~216 | | 248 |
| S1-Err208~216 | | 249 |
| S2-Err208~216 | | 250 |
| S3-Err208~216 | | 251 |

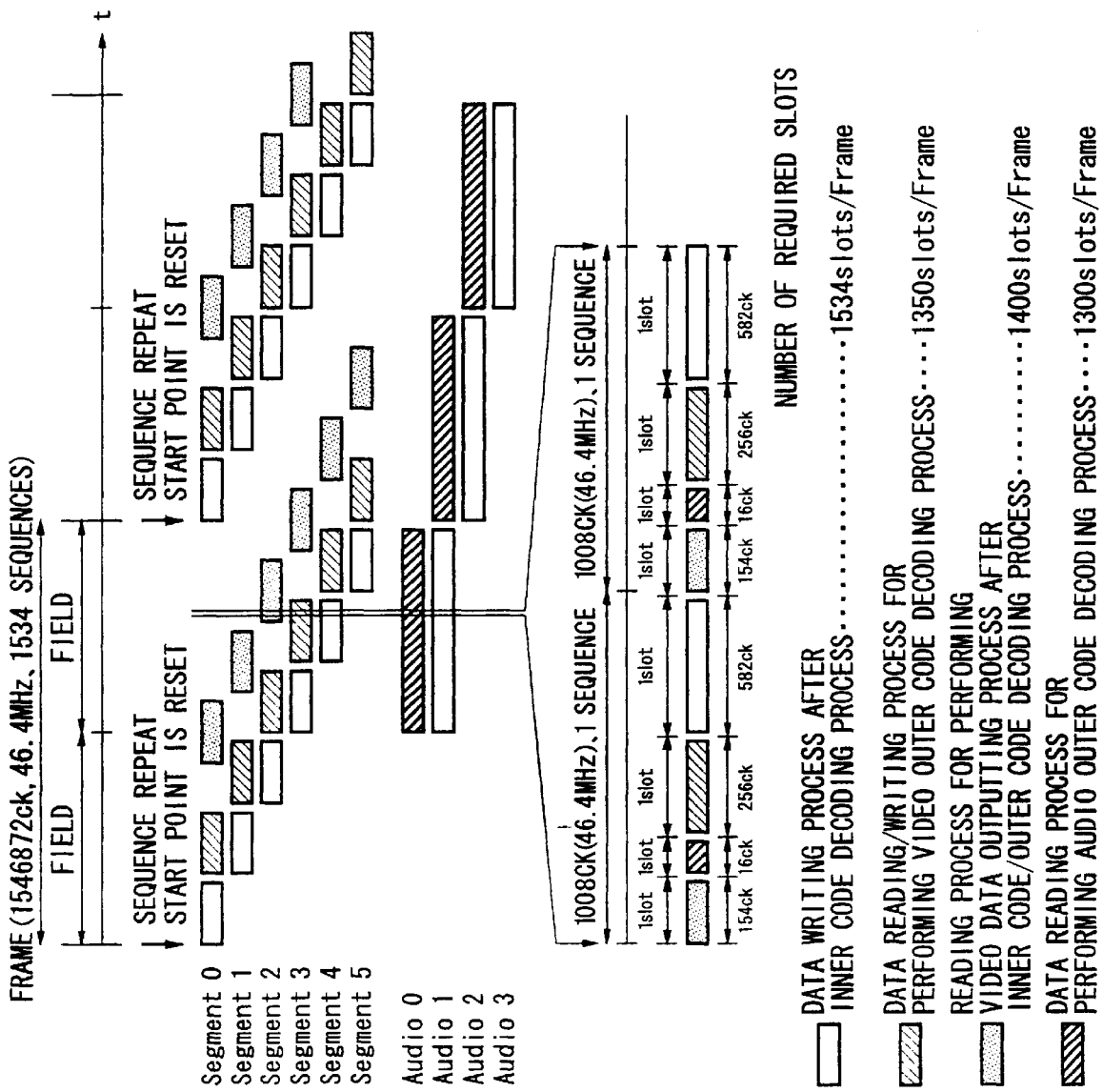

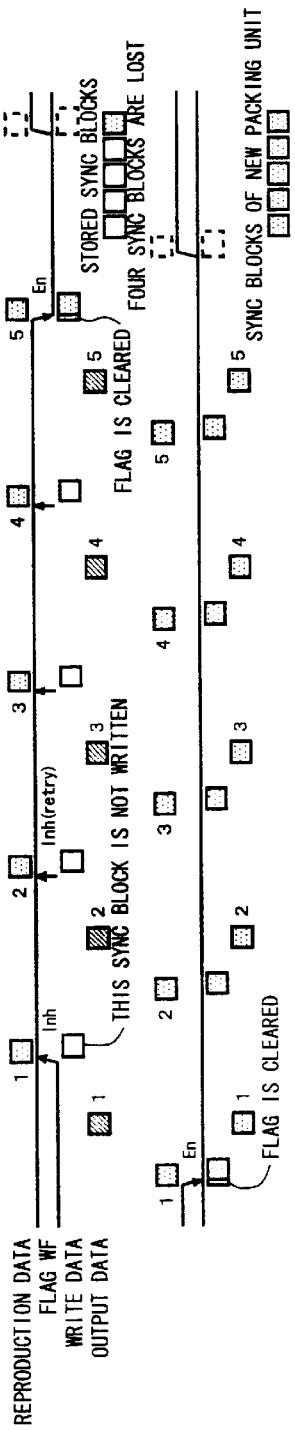
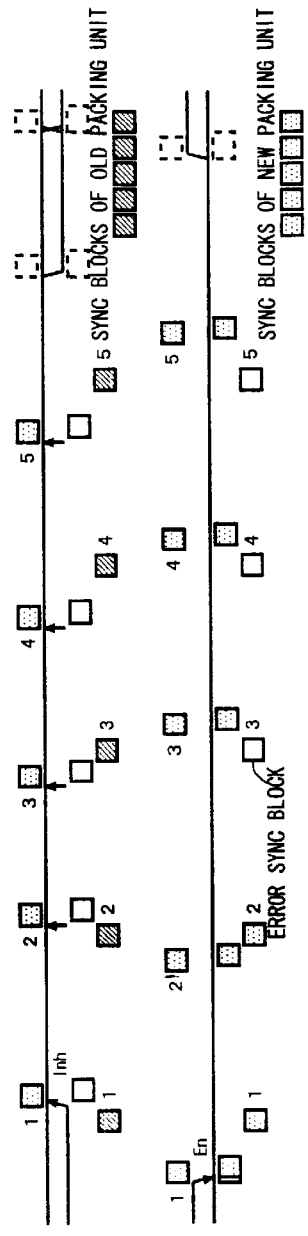
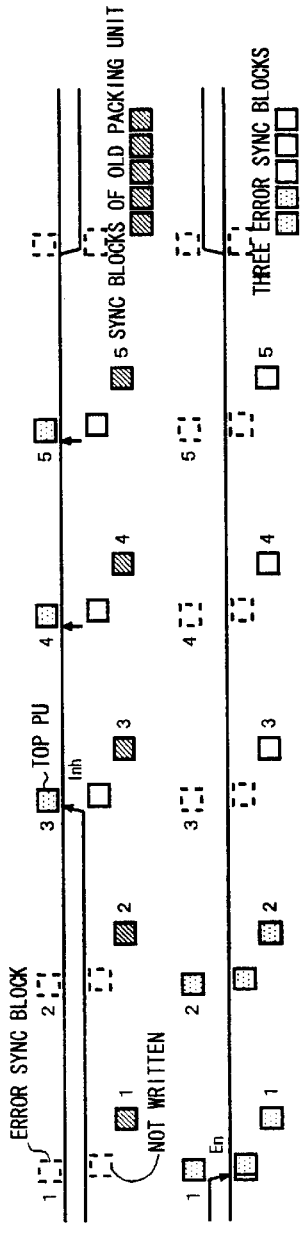
Fig. 27A
Fig. 27B
Fig. 27C
Fig. 27D
Fig. 27E
Fig. 27F

DIGITAL VIDEO SIGNAL PROCESSING APPARATUS AND METHOD THEREOF, AND DIGITAL VIDEO SIGNAL REPRODUCING APPARATUS

BACKGROUND OF THE INVENTION

1. Field of the Invention

The present invention relates to a digital video signal processing apparatus for compression-encoding a digital video signal as blocks, a method thereof, and a digital video signal reproducing apparatus thereof.

2. Description of the Related Art

A digital video tape recorder that records/reproduces a digital video signal has been practically used (hereinafter the digital video tape recorder is referred to as DVTR). In the DVTR, digital video data is compressed, encoded with error correction code, and then recorded to a record medium such as a magnetic tape.

FIG. 1 is a block diagram showing an example of the structure of the DVTR. For example, digital video data as record data is supplied to a BRR (Bit Rate Reduction) encoder 101 through an interface 100. The BRR encoder 101 compresses and encodes the record data corresponding to for example DCT (Discrete Cosine Transform) method. The encoded record data is supplied to an error correction code encoder 102 that encodes the record data with for example product code.

The error correction code encoder 102 is connected to a RAM (not shown). Data supplied to the error correction code encoder 102 is written to the RAM. The error correction code encoder 102 generates outer code parity for the record data written to the RAM in the column direction with Reed-Solomon code and likewise generates inner code parity thereof in the line direction. Thus, the error correction code encoder 120 encodes the record data with product code. The data size of product code as inner code and outer code is referred to as error correction block.

The error correction encoder 102 reads the encoded record data from the RAM in the row direction and supplies the resultant data to a record driving portion 103 that includes a recording amplifier. Thereafter, a magnetic head 104 records the data received from the record driving portion 104 to a magnetic tape 105.

At this point, the data is recorded corresponding to a helical scan method of which the magnetic head 104 is disposed on a rotating drum and the magnetic head 104 forms slanted tracks on the magnetic tape 105. In addition, the data is recorded corresponding to an azimuth recording method of which azimuth angles of adjacent two tracks are different.

FIGS. 2A, 2B, 3A, and 3B show examples of structures of the above-described error correction blocks. In these examples, data of one frame is composed of 12 tracks formed on a magnetic tape 105. In addition, a segment is composed of a pair of adjacent two tracks with different azimuth angles. Thus, one frame is composed of 12 tracks (=six segments). These segments are assigned segment numbers 0 to 5.

In the example of video data shown in FIGS. 2A and 2B, one track of 12 frames forms one error correction block shown in FIG. 2B. For example, data of each column is encoded in the direction of arrow b with (250, 226) Reed-Solomon code. Thus, outer code parity of 24 bytes is formed. In addition, the resultant video data and the outer code parity are encoded in the direction of arrow a with (229, 217) Reed-Solomon code. Thus, inner code parity of 12 bytes is formed. Sync data of two bytes and ID of two bytes are placed at the beginning of each data row.

FIGS. 3A and 3B show an example of the structure of an error correction block of audio data. As shown in FIG. 3A, in audio data, one error correction block is composed of six tracks in 12 tracks of one frame. For example, audio data composed of a data array of 217 bytes×12 bytes is encoded in the direction of arrow b with (24, 12) Reed-Solomon code. Thus, outer code parity of 12 bytes is formed. In addition, the resultant data and the outer code parity are encoded in the direction of arrow a with for example (229, 217) Reed-Solomon code. Thus, inner code parity of 12 bytes is generated. Moreover, sync data and ID are placed at the beginning of each data row.

FIG. 4 is a schematic diagram showing an example of the structure of one sync block of an error correction block of video data. Referring to FIG. 4, the first two bytes are sync data. The sync data is followed by ID of two bytes. The ID represents a unique number of the current sync block in one track (segment number) or an unique sync block number. The ID is followed by video data of 217 bytes (or outer code parity) and inner code parity. Record data on the magnetic tape is composed of a sequence of sync blocks.

Data recorded on the magnetic tape 105 is read as reproduction data by a magnetic head 106. The reproduction data is supplied to an inner code decoder 108 through an equalizer 107. The inner code decoder 108 decodes the reproduction data with inner code using a RAM 109 connected thereto. In other words, the inner code decoder 108 corrects an error of each row corresponding to inner code parity placed thereto. When the number of errors exceeds the error correction capability of the code and errors remain, the inner code decoder 109 sets an error flag to all symbols of the row. The inner code decoder 108 writes error corrected reproduction data to the RAM 109.

The inner code decoder 108 reads the error corrected reproduction data in the column direction of the product code from the RAM 109 and arranges the data. sequence in the direction of the outer code. The inner code decoder 108 supplies the resultant reproduction data to an outer code decoder 110. The outer code decoder 110 corrects an error of data with the outer code. In other words, the outer code decoder 110 corrects an error of each column of the data corresponding to outer code parity placed thereto. The outer code decoder 110 uses outer code and the error flag placed to each symbol by the inner code decoder 108. The outer code decoder 110 writes the error corrected reproduction data to a RAM 111 connected thereto.

As the error corrected result, the outer code decoder 110 sets an error flag to each symbol. The error flag represents that an error remains in the case that the number of errors exceeds the error correction capability of the code and the outer code decoder 110 cannot correct the errors of the data.

The outer code decoder 110 reads the resultant reproduction data that has been corrected with outer code in the row direction from the RAM 111. Thus, the read direction that has been changed in the RAM 109 is restored to the original read direction.

The resultant reproduction data that has been corrected with inner code and outer code is supplied to a BRR decoder 112. The BRR decoder 112 decodes the reproduction data that has been compressed and encoded. Output data of the BRR decoder 112 is supplied as digital video data to the outside of the DTVR through an interface 113.

Data with the error flag that represents an error thereof has not been corrected by the outer code decoder 110 is concealed corresponding to for example interpolating method.

As described above, in the DVTR, to effectively record/reproduce data to/from a record medium, when a video signal is recorded, it is compressed and encoded corresponding to for example DCT method. In this method, video data is divided into DCT blocks each of which is composed of 8×8 pixels. DCT coefficients are obtained for each DCT block. In addition, corresponding to the obtained DCT coefficients, data is compressed and encoded. In such a compressing and encoding method, the size of data that has been compressed varies corresponding to DCT coefficients of each DCT block. In other words, the required data amount largely varies corresponding to the complexity of an image that data of the DCT block represents as shown in FIGS. 5A and 5B.

In FIG. 5A, each of areas A to E surrounded by dotted lines corresponds to DCT blocks for one sync block. In FIGS. 5B and similar drawings, the left side represents a low frequency component side (including DC component) of DCT coefficients, whereas the right side represents a high frequency component side. In these drawings, A to E correspond to areas A to E, respectively. As are clear from FIGS. 5A and 5B, since the image in the area A is complicated, DCT coefficients widely distribute from low frequency components to high frequency components. Thus, the data amount of the area A that has been compressed and encoded is large. On the other hand, since the area D is a simple image, DCT coefficients distribute in only low frequency components. Thus, the data amount of the area D that has been compressed and encoded is small. Consequently, the data amount of an image that has been compressed and encoded depends on the complexity thereof.

Data that has been compressed and encoded are placed in sync blocks so as to form error correction blocks. However, as described above, since the data amount of the compressed data largely varies corresponding to the complexity of the image, as with the example of the area A, the data amount may exceed one sync block. In contrast, as with the area D, the data amount may be smaller than one sync block. In this case, the sync block may have a large blank portion.

Conventionally, when data cannot be placed in one sync block, the data is discarded in the order of higher frequency components that are not remarkable portions of the image. Thus, since higher frequency components of DCT coefficients are lost, an image in high quality cannot be reproduced. To effectively place data and obtain a reproduction image in high quality, a method for packing a plurality of sync blocks has been proposed. In this method, for example five sync blocks are packed as one unit. The packed unit is referred to as a packing unit. Data that cannot be placed in one sync block is temporarily placed in another sync block that has a blank portion of the same packing unit. In this case, data is placed in the order of DC component and lower frequency components that are remarkable in the image.

FIGS. 6A and 6B show an example of a method for placing such data to another sync block. In FIG. 6A, it is assumed that the first row represents the length of one sync block. In an area A (on the second row), data elements A6 to A9 protrude from one sync block. In an area C (on the fourth row), data elements C7 to C9 protrude from one sync block. In an area E (on the sixth row), a data element E6 protrudes from one sync block. In contrast, an area B (on the third row) and an area D (on the fifth row) have blank portions. To equally place data elements in five sync blocks of one packing unit, data elements of individual areas are arranged as shown in FIG. 6B.

The compressed and encoded data is arranged for each sync block, encoded with error correction code, and then recorded to the magnetic tape 105. Thus, even if the data that has been compressed and encoded becomes larger than one sync block, the probability of which data is discarded is very low. Consequently, an image in high quality can be obtained.

Now, it is considered that such data is read and reproduced from the magnetic tape 105. In the normal reproducing mode whose speed is the same as that in the recording mode, all data of a packing unit composed of five sync blocks can be read. Thus, the BRR decoder 112 can completely decode data including data elements temporarily placed in other sync blocks of the same packing unit.

In other words, before the BRR decoder 112 decodes such data, it restores data elements that have been temporarily placed in other sync blocks to the original sync blocks. This process is referred to as unpacking process. The unpacking process is performed for example after the outer code decoder 110 corrects error of data with outer code. Thus, the BRR decoder 112 decodes each sync block that has been unpacked.

However, in a variable-speed reproducing mode whose reproducing speed is different from the recording speed, five sync blocks of a packing unit cannot be securely read. In this case, the BRR decoder 112 cannot correctly decode data that has been compressed and encoded.

In the variable-speed reproducing mode, the relative speed between the magnetic head 106 and the magnetic tape 105 varies from that in the normal reproducing mode. Thus, the tracing angle of which the magnetic head 106 traces a track formed on the magnetic tape 105 varies. Thus, the magnetic head 106 traces a plurality of tracks at a time.

FIG. 7 is a schematic diagram showing the structure of one track. One track is composed of an audio track portion of 16 sync blocks and two video track portions of 127 sync blocks and 123 sync blocks. The audio track portion is sandwiched with the two video track portions. FIGS. 8 to 11 are schematic diagrams showing tracing relations between tracks and the magnetic head 106 in the normal reproducing mode and variable speed reproducing modes of 2-times speed, 10-times speed, and 50-times speed. In the normal reproducing mode shown in FIG. 8, the magnetic head 106 accurately traces a relevant track and thereby reads all 250 sync blocks of video data on the track.

FIG. 12 is a schematic diagram showing an unpacking process of which the packing unit shown in FIG. 6B is unpacked in the normal reproducing mode. In FIG. 12, data elements in the areas A, C, and E that have been temporarily placed in the areas B and D are restored to the original areas (thus, the unpacking process is performed). Since DCT coefficients in these areas are restored, data can be normally decoded. Thus, an image in high quality can be reproduced.

On the other hand, in the variable-speed reproducing modes, as shown in FIGS. 9 to 11, the magnetic head 106 traces a plurality of tracks at a time. As shown in FIGS. 9, 10, and 11, the magnetic head 106 traces 2 tracks, 10 tracks, and 50 tracks with the same azimuth angle in the 2-times speed reproducing mode, the 10-times speed reproducing mode, and the 50-times speed reproducing mode, respectively.

When data is reproduced from a plurality of tracks, a sync block of another packing unit may mix with the current packing unit as one packing unit. When the BRR decoder 112 decodes high frequency components in the state that a sync block of another packing unit mixes with the current packing unit, improper data is decoded. Thus, an image cannot be correctly reproduced.

To solve such a problem, in the variable reproducing modes including a low-speed reproducing mode, all high frequency components that have been placed in sync blocks of another packing unit are discarded. The resultant data is decoded for each sync block containing only low frequency components. Thus, in the variable-speed reproducing modes, since high frequency components are lost, an image in deteriorated quality is reproduced.

FIG. 13 is a schematic diagram showing such a situation. In this example, the packing unit shown in FIG. 6B mixes with a sync block 300 of another packing unit. When the packing unit shown in FIG. 13 is unpacked in the same manner as the packing unit in the normal reproducing mode shown in FIG. 12, instead of data elements of the areas A, C, and E that protrude from one sync block, data elements of the sync block 300 are decoded. Thus, the data cannot be properly decoded. Conventionally, data elements 301 of another packing unit, a sync block 302 that contains data elements of the current packing unit, and a sync block 303 that contains DCT coefficients are discarded.

In a low-speed reproducing mode as a variable reproducing mode, since most sync blocks are successively read, the probability of which five sync blocks of one packing unit are collectively obtained is high. However, there is a possibility of which the current packing unit mixes with a sync block of another packing unit even if the probability is low. Conventionally, to prevent such a rare situation from taking place, all high frequency components that have been placed in sync blocks of another packing unit are discarded. Thus, an image with deteriorated quality is obtained.

On the other hand, in high-speed reproducing modes of 2-times speed, 10-times speed, 50-times speed, and so forth, five sync blocks of one packing unit may be correctly obtained to some extent. For example, in the 2-times speed reproducing mode, since two tracks with the same azimuth angle are read at a time, it can be expected that 125 sync blocks will be read per track. In this case, it can be said that the probability of which a packing unit of five sync blocks is read is high. In this case, with all data elements that have been placed in sync blocks of the current packing unit, a decompressing process can be performed. Thus, an image in higher image quality can be obtained.

However, in the 50-times speed reproducing mode, since 50 tracks with the same azimuth angle are read at a time. With 250 sync blocks/50 tracks, only five sync blocks are read per track. In this case, since there is a probability of which the current packing unit mixes with data elements of sync blocks of another packing unit, when data elements that have been placed in other sync blocks are discarded, it can be expected that an image in higher image quality will be obtained.

When a process corresponding to a reproducing speed is performed, a reproduced image in high quality can be adaptively obtained. However, conventionally, since data elements that have been placed in other sync blocks are unconditionally discarded, an image in deteriorated quality is obtained.

OBJECTS AND SUMMARY OF THE INVENTION

Therefore, an object of the present invention is to provide a digital video signal processing apparatus, a method thereof, and a digital video signal reproducing apparatus that perform a decoding process for data that has been compressed and encoded using also high frequency components in a variable-speed reproducing mode in the case that data is handled with a packing unit composed of a plurality of sync blocks so as to reproduce an image in high quality.

A first aspect of the present invention is a digital video signal processing apparatus for reproducing data that has been compressed and encoded for each block, processing the encoded data, and packing the encoded data of a predetermined number of sync blocks as a unit in such a manner that encoded data that cannot be placed in one sync block is placed in another sync block of the unit, the apparatus comprising a detecting means for detecting whether or not each unit of reproduction data mixes with a sync block of another unit, a unpacking means for restoring encoded data placed in another sync block to the original sync block when the current unit does not mix with a sync block of another unit and for invalidating sync blocks when the current unit mixes with a sync block of the another unit, and a decoding means for decoding each sync block of digital video data that is output from the unpacking means.

A second aspect of the present invention is a digital video signal processing apparatus for reproducing data that has been compressed and encoded with error correction code for each block, processing the encoded data, and packing the encoded data of a predetermined number of sync blocks as a unit in such a manner that encoded data that cannot be placed in one sync block is placed in another sync block of the unit, the apparatus comprising error correcting means for performing an error correcting process, a memory for storing data that has been error-corrected by the error correcting means, a memory controlling means for receiving data to be written to the memory and data that is read from the memory, and performing an access controlling process for the data to the memory, a detecting means for detecting whether or not the current unit mixes with a sync block of another unit corresponding to the data supplied to the memory controlling means, the data that is written to the memory, and the data that is read from the memory, an unpacking means for restoring encoded data placed in another sync block to the original sync block when the current unit does not mix with a sync block of another unit and for invalidating sync blocks when the current unit mixes with a sync block of the another unit, and a decoding means for decoding each sync block of digital video data that is output from the unpacking means.

A third aspect of the present invention is a digital video signal reproducing apparatus having a digital video signal processing apparatus for reproducing data that has been compressed and encoded for each block, processing the encoded data, and packing the encoded data of a predetermined number of sync blocks as a unit in such a manner that encoded data that cannot be placed in one sync block is placed in another sync block of the unit, the digital video signal reproducing apparatus comprising a detecting means for detecting whether or not each unit of reproduction data mixes with a sync block of another unit, an unpacking means for restoring encoded data placed in another sync block to the original sync block when the current unit does not mix with a sync block of another unit and for invalidating sync blocks when the current unit mixes with a sync block of the another unit, and a decoding means for decoding each sync block of digital video data that is output from the unpacking means.

A fourth aspect of the present invention is a digital video signal reproducing apparatus having a digital video signal processing apparatus for reproducing data that has been compressed and encoded with error correction code for each block, processing the encoded data, and packing the encoded data of a predetermined number of sync blocks as a unit in such a manner that encoded data that cannot be placed in one sync block is placed in another sync block of the unit, the digital video signal reproducing apparatus comprising an error correcting means for performing an error correcting process, a memory for storing data that has been error-corrected by the error correcting means, a memory controlling means for receiving data to be written to the memory and data that is read from the memory, and performing an access controlling process for the data to the memory, a detecting means for detecting whether or not the current unit mixes with a sync block of another unit corresponding to the data supplied to the memory controlling means, the data that is written to the memory, and the data that is read from the memory, an unpacking means for restoring encoded data placed in another sync block to the original sync block when the current unit does not mix with a sync block of another unit and for invalidating sync blocks when the current unit mixes with a sync block of the another unit, and a decoding means for decoding each sync block of digital video data that is output from the unpacking means.

A fifth aspect of the present invention is a digital video signal processing method for reproducing data that has been compressed and encoded for each block, processing the encoded data, and packing the encoded data of a predetermined number of sync blocks as a unit in such a manner that encoded data that cannot be placed in one sync block is placed in another sync block of the unit, the method comprising the steps of (a) detecting whether or not each unit of reproduction data mixes with a sync block of another unit, (b) restoring encoded data placed in another sync block to the original sync block when the current unit does not mix with a sync block of another unit and for invalidating sync blocks when the current unit mixes with a sync block of the another unit, and (c) decoding each sync block of digital video data that is output at step (b).

A sixth aspect of the present invention is a digital video signal processing method for reproducing data that has been compressed and encoded with error correction code for each block, processing the encoded data, and packing the encoded data of a predetermined number of sync blocks as a unit in such a manner that encoded data that cannot be placed in one sync block is placed in another sync block of the unit, the method comprising the steps of (a) performing an error correcting process, (b) storing data that has been error-corrected at step (a), (c) receiving data to be written to the memory and data that is read from the memory, and performing an access controlling process for the data to the memory, (d) detecting whether or not the current unit mixes with a sync block of another unit corresponding to the data supplied at step (c), the data that is written to the memory, and the data that is read from the memory, (e) restoring encoded data placed in another sync block to the original sync block when the current unit does not mix with a sync block of another unit and for invalidating sync blocks when the current unit mixes with a sync block of the another unit, and (f) decoding each sync block of digital video data that is output at step (e).

As described above, data that has been compressed and encoded as each block is packed as each unit composed of a plurality of sync blocks. When encoded data elements cannot be placed in one sync block, the remaining data elements are placed in other sync blocks of the unit. It is determined whether or not each unit of reproduction data mixes with data elements of sync blocks of another unit. When the current unit does not mix with data elements of sync blocks of another unit as the determined result, data elements placed in other sync blocks are restored to the original sync blocks. When the current unit mixes with data elements of sync blocks of another unit as the determined result, data elements placed in other sync blocks are discarded. When data that has been compressed and encoded is decoded, an image deterioration due to the mixture of data elements of the current unit and another unit can be suppressed.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 1 is a block diagram showing an example of an outlined structure of a conventional DVTR;

FIGS. 3A and 3B are schematic diagrams showing an example of the structure of an error correction block;

FIG. 17 is a schematic diagram showing an example of a format of which reproduction data for one sync block is written to an SDRAM;

FIG. 18 is a schematic diagram showing an example of a row address assignment of the SDRAM;

FIG. 19 is a schematic diagram showing an example of a column address assignment of the SDRAM;

FIGS. 21A, 21B, 21C, and 21D are schematic diagrams showing an example of a time division process for a data write operation and data read operation for the SDRAM;

FIGS. 23A, 23B, 23C, 23D, 24E, and 24F are schematic diagrams showing examples of which a packing unit written to the SDRAM overlaps with a packing unit read from the SDRAM;

FIGS. 27A, 27B, 27C, 27D, 27E, and 27F are schematic diagrams showing states of sync blocks in the case that the packing unit mixture inhibiting process according to the present invention is performed;

FIGS. 28A, 28B, 28C, 28D, 28E, and 28F are schematic diagrams showing states of sync blocks in the case that the packing unit mixture inhibiting process according to the present invention is performed.

DETAILED DESCRIPTION OF THE PREFERRED EMBODIMENTS

Next, an embodiment of the present invention will be described. For easy understanding of the present invention, with reference to FIG. 14, a DVTR according to the present invention will be described. In the structure shown in FIG. 14, an inner code decoder and an outer code decoder that decode data with product code are composed of an integrated circuit. When data is decoded, the inner code decoder and the outer code decoder share a data re-arranging RAM.

Figure 14:
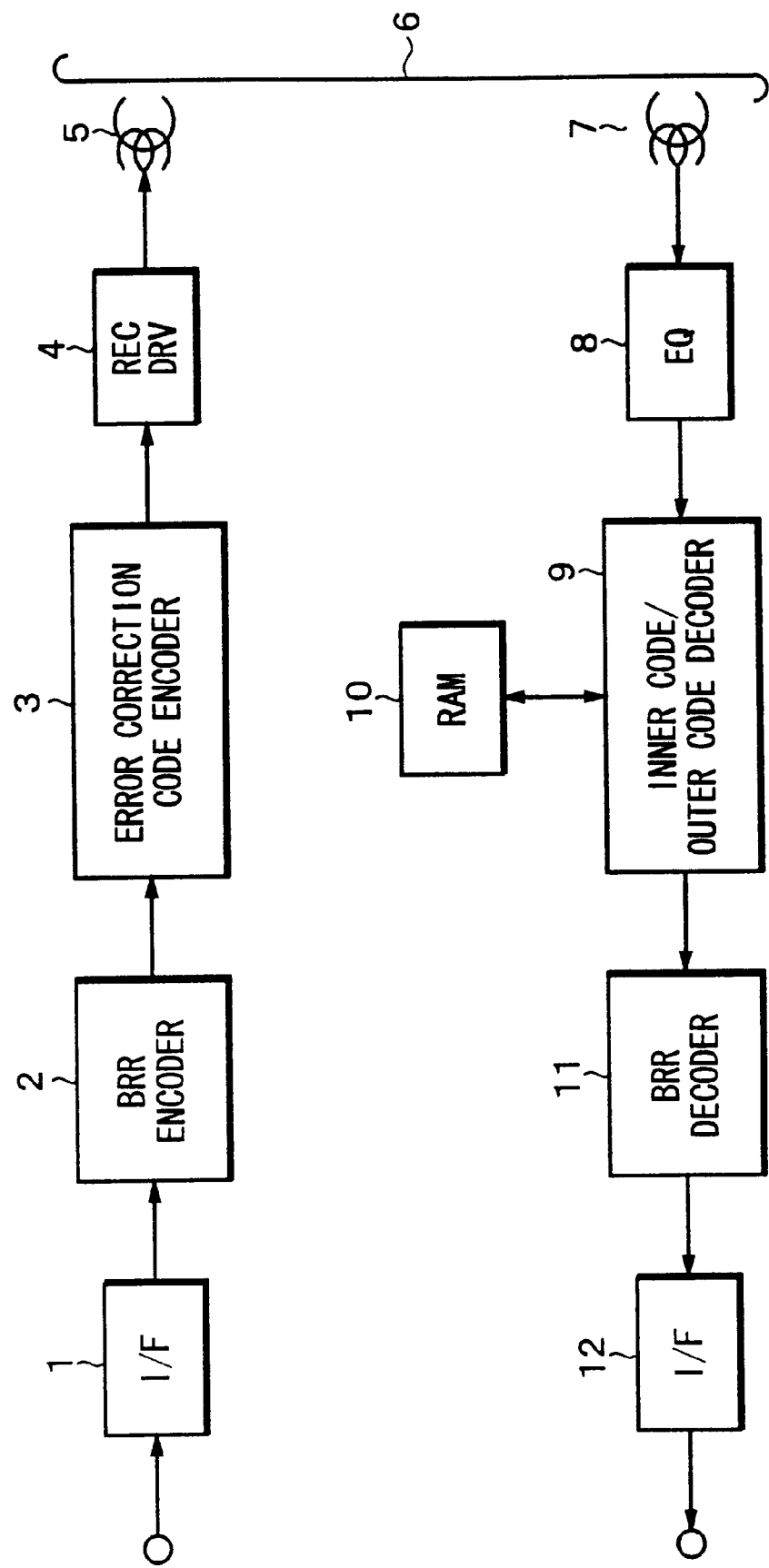
FIG. 14 is a block diagram showing an example of the structure of a DVTR according to the present invention.

In FIG. 14, record data that is composed of video data and four-channel audio data is supplied to a BRR encoder 2 through an interface 1. The BRR encoder 2 compresses the received record data and forms encoded data. For example, the BRR encoder 2 performs a block-segmenting process, a DCT process, a quantizing process, and a variable-length code encoding process for the record data so as to form the encoded data.

In addition, the BRR encoder 2 performs the above-described packing process for the record data. In other words, the BRR encoder 2 arranges DCT coefficients in the order of lower frequency components for at least one DCT block and places the arranged DCT coefficients in sync blocks and forms one packing unit with a plurality of sync blocks. In this example, one packing unit is composed of five packing units.

When sync blocks are packed, DCT coefficients that cannot be placed in one sync block are placed in another sync block of the current packing unit. Each sync block of a packing block contains coefficients, information concerning temporary placement thereof, and so forth. A quantizing process is performed so that DCT coefficients of a predetermined number of DCT blocks are placed in five sync blocks. Such compressed and packed record data is supplied to an error correction code encoder 3.

The error correction code encoder 3 is connected to a RAM (not shown). The supplied record data is written to the RAM. As described above, outer code parity and inner code parity are generated for the record data written to the RAM. Thus, the record data is encoded with product code. The data size of product code of inner code and outer code is referred to as error correction block.

Since an error correction block and a sync block that is the minimum data unit are well known, their description is omitted.

The encoded data is read from the RAM in the row direction and supplied to a record driving portion 4 that has a recording amplifier 4. Thereafter, the encoded data is recorded to a magnetic tape 6 by a magnetic head 5. The encoded data is recorded corresponding to helical scan method of which slanted tracks are formed on the magnetic tape 6 by the magnetic head 5 disposed on a rotating drum. In addition, the encoded data is recorded corresponding to azimuth method of which adjacent tracks are recorded by a pair of magnetic heads with different azimuth angles.

As an example of the recording method, assuming that four magnetic heads 5 are disposed on a rotating drum and channels corresponding to these heads are denoted by A, B, C, and D, the four magnetic heads 4 form tracks A, B, C, and D in the order. The azimuth angle of the track A is the same as the azimuth angle of the track C. The azimuth angle of the track B is the same as the azimuth angle of the track D. At this point, a segment is composed of adjacent two tracks with different azimuth angles (channels A and B or channels C and D). Four-channel audio data is sandwiched by two parts of video data.

The magnetic head 7 reads data from the magnetic tape 6 in the order that the data was recorded to the magnetic tape 6. The data that is read from the magnetic head 7 is referred to as reproduction data. The reproduction data is supplied to an equalizer 8. The equalizer 8 outputs serial data to an inner code/outer code decoder 9. The inner code/outer code decoder 9 is composed of an integrated circuit. The inner code/outer code decoder 9 is connected to a RAM 10. The inner code/outer code decoder 9 controls addresses of the RAM 10.

The inner code/outer code decoder 9 corrects an error of the reproduction data with inner code, controls the address of the RAM 10, and writes the resultant data to the relevant address of the RAM 10. After the RAM 10 has stored data for one error correction block, the data is read from the RAM 10 in the direction of outer code and supplied to the inner code/outer code decoder 9. The inner code/outer code decoder 9 corrects an error of the data with outer code and write the resultant data to the RAM 10. After errors of one error correction block have been corrected, under the control of the inner code/outer code decoder 9, the data is read from the RAM 10 in the direction of inner code (in other words, the direction of the original data). When errors of the data exceed the error correction capability of the code, an error flag is set to a particular position of the data.

The inner code/outer code decoder 9 assigns a packing unit number PU to each packing unit so as to identify it. The packing unit number PU is assigned corresponding to for example a segment number and a sync block number. Thus, the packing unit number PU cycles every frame.

When data is input/output to/from the RAM 10 in the inner code/outer code error correcting processes, the data unit for video data is different from the data unit for audio data. In addition, the RAM 10 is shared in the outer code/inner code error correcting processes and data is re-arranged in the RAM 10. The data write timing and data read timing for the RAM 10 become complicated. Thus, the inner code/outer code decoder 9 controls the data write timing and data read timing for the RAM 10 on time division basis. This controlling process will be described later.

In addition, the inner code/outer code decoder 9 unpacks data that has been packed when the data has been recorded. In other words, the inner code/outer code decoder 9 restores data elements temporarily placed in other sync blocks to the original sync block for each packing unit. At this point, the inner code/outer code decoder 9 performs the unpacking process corresponding to a predetermined algorithm in such a manner that the current packing unit does not mix with data elements of sync blocks of another packing unit (the unpacking process will be described later).

The reproduction data that has been unpacked and output from the inner code/outer code decoder 9 is supplied to a BRR decoder 11. The BRR decoder 11 decompresses and decodes data that has been compressed and encoded. For example, the BRR decoder 11 performs a variable-length code decoding process, a dequantizing process, an inverse DCT process, and an inverse block-segmenting process for the data supplied from the inner code/outer code decoder 9. The inner code/outer code decoder 9 unpacks data in such a manner that the current packing unit does not mix with data elements of sync blocks of another packing unit. Thus, the BRR decoder 11 can correctly decompress data. The decompressed reproduction data is output as digital video data to the outside of the DVTR through an interface 12.

Data with the error flag that represents an error thereof has not been corrected by the inner code/outer code decoder 9 is concealed corresponding to for example interpolating method.

Figure 15:
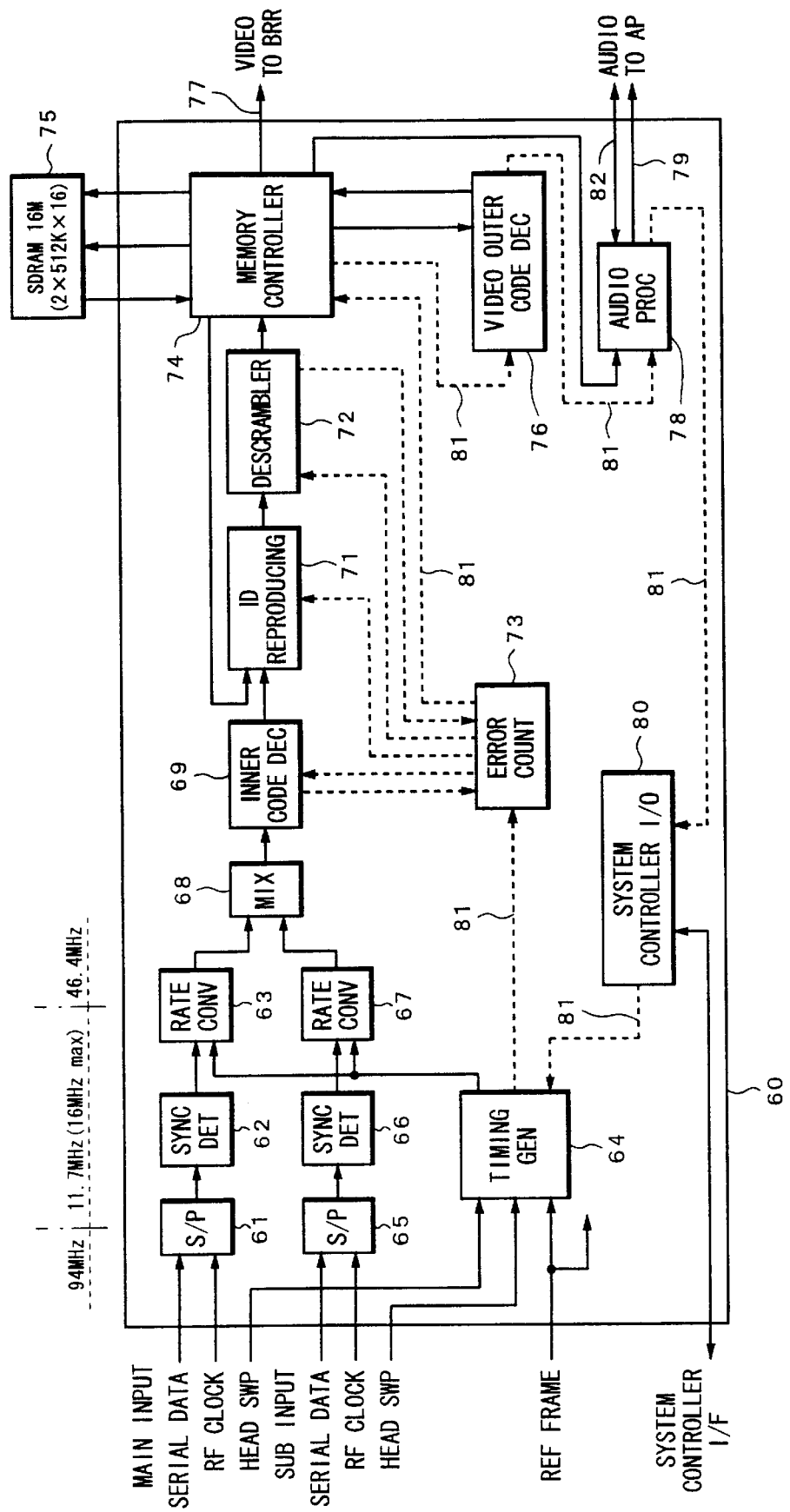
FIG. 15 is a block diagram showing an example of a detailed structure of an inner code/outer code decoder.

Next, with reference to FIG. 15, the structure of the inner code/outer code decoder 9 will be described. In FIG. 15, reference numeral 60 represents an IC circuit of the inner code/outer code decoder 9. The ECC decoder IC 60 basically has an inner code error correcting function, an outer code error correcting function, an audio signal processing function, an error counting function, and an auxiliary data reading function. In reality, the ECC decoder IC 60 is paired with another ECC decoder IC 60'. The structure of the ECC decoder IC 60 is the same as the structure of the ECC decoder IC 60'. In the ECC decoder IC 60, reproduction data of a first azimuth is input. Serial data reproduced at a record rate of 94 Mbps and a clock signal generated therewith are input in parallel to the ECC decoder IC 60. The serial data and the clock signal are supplied to a S/P converter 61. The S/P 61 outputs parallel data of eight bits wide and 1/8 frequency-divided clock signal.

In this stage, since high speed data of one bit wide is simply converted into low speed data of eight bits wide, the resultant data is properly delimited every byte and every sync block. The resultant data is supplied to a synchronization detecting circuit 62. The synchronization detecting circuit 62 converts the data received from the S/P converter 61 into a normal data string. The delimitation of each byte is defined with a bit assignment of an output terminal of the synchronization detecting circuit 62. The delimitation of each sync block is defined with a strobe pulse STB generated by the synchronization detecting circuit 62. The output data of the synchronization detecting circuit 62 is supplied to a rate converter 63. The rate converter 63 converts the clock signal of 11.7 MHz into a system clock signal of 46 MHz.

The ECC decoder IC 60 has two system inputs that are a main system and a sub system corresponding to an eight-head system. Although the above-described structure is for the main system, the structure applies to the sub system. In other words, as with the main system, to process reproduction data of the sub system, the ECC decoder IC 60 has an S/P converter 65, a synchronization detecting circuit 66, and a rate converter 67. A data packet that is output from the rate converter 63 and a data packet that is output from the rate converter 67 are supplied to an OR circuit of a mixer 68. Since the rate converters 63 and 67 convert the data rate of 11 Mbps of the signal into the data rate of 46 Mbps, a gap between adjacent packets. Thus, data of the sub system and data of the main system can be mixed. However, when the mixing process is unconditionally performed, data of the sub system collides with data of the main system. Thus, the two rate converters 63 and 67 reference the busy state of the other rate converter and stop outputting data in the busy state of the other rate converter. At this point, each of the rate converters 62 and 66 sets a one-bit sub/main flag to a packet so as to identify the source thereof.

The rate converters 63 and 67 have inner small RAMs as buffers for performing such a start-stop process and absorbing jitters of the traveling speed of the magnetic tape 6 and the rotating speed of the rotating drum. The buffers are connected to an inner code decoder 69. The inner code decoder 69 controls the output data of the buffers.

A switching pulse supplied from the outside of the ECC decoder IC 60 is input to a timing generator 64. The timing generator 64 delays the switching pulse SWP for a delay time period of the inner circuit. Likewise, information that represents the tape traveling direction is delayed. The rate converters 63 and 67 place the delayed switching pulse to data packets. The rate converters 63 and 67 have counters that are initialized at a head switching timing and are activated with a strobe pulse STB. The rate converters 63 and 67 detect a non-data record region (hereinafter referred to as gap) with the counters. The rate converters 63 and 67 place information representing a non-data record region to data packets.

Data packets are output from the mixer 68 to the inner code decoder 69. The inner code decoder 69 places error correction information that represents whether an error cannot be corrected and how many bytes of data have been corrected to data packets. The resultant data is supplied to an ID restoring circuit 71. When the inner code decoder 69 cannot correct an error of data with inner code, the ID is not trustful. However, since a memory controller 74 (that will be described later) decides an outer code correction sequence of a data packet with reference to an ID thereof, the ID should be restored. The ID restoring circuit 71 restores an ID of an uncorrectable data packet with IDs of adjacent correctable packets. The ID restoring circuit 71 has two RAMS for the main system and the sub system. Each of these RAMs stores three data packets so that the ID restoring circuit 71 can reference data packets that preceded by the current packet. With the RAMs, the data converting process into data of 16 bits wide and the stop-start process with a video outer code decoder 76 are performed.

The error correction information that is output from the inner code decoder 69 is input to an error monitor (not shown). The error monitor encodes the error correction information and other information and outputs resultant signals for the main system and the sub system to the outside of the ECC decoder IC 60. The output signals are D/A converted so as to monitor the error correction state.

Output data of the ID restoring circuit 71 is supplied to a descrambler 72. The descrambler 72 descrambles output data of the ID restoring circuit 71. The above-described packing unit number PU is added to each packing unit by for example the ID restoring circuit 71 or the descrambler 72.

Main data that is output from the descrambler 72 is supplied to a memory controller 74. The memory controller 74 controls an address of an outer SDRAM 75 (Synchronous Dynamic Random Access Memory) corresponding to a sync block number and a segment number assigned to the data and writes the data to the relevant area of the SDRAM 75. At this point, the memory controller 74 controls receive timing of data received from the descrambler 72. In addition, the memory controller 74 controls addresses of the SDRAM 75 for each segment of video data and audio data.

When the SDRAM 75 has stored video data of the main system for one error correction block (one track), the memory controller 74 controls the SDRAM 75 so as to read data in the direction of outer code and supply the resultant data to the video outer code decoder 76. Thus, the video outer code decoder 76 performs the outer code error correcting process for the data received from the SDRAM 75. The memory controller 74 writes output data of the video outer code decoder 76 to the SDRAM 75. In a high speed reproducing mode, since the magnetic head 7 does not accurately trace a track, all data elements in the outer code direction cannot be obtained. Thus, in a high speed reproducing mode, the video outer code decoder 76 is inhibited from performing the outer code error correcting process.

The memory controller 74 selects main data or sub data for data that has been decoded with outer code for one track and reads the resultant data from the SDRAM 75 in the direction of inner code. The resultant data is supplied to an ID renumbering circuit (not shown). The ID renumbering circuit changes the ID of the data so as to interface with a BRR decoder 11 disposed downstream of the IC 60. The resultant data is output from a terminal 77.

The above-described unpacking process is performed by the memory controller 74. The memory controller 74 checks for the relation between data that is input to/output from the memory controller 74 and data that is read from/written to the SDRAM 75. According to a predetermined algorithm (that will be described later), the memory controller 74 performs the unpacking process in such a manner that the current packing unit does not mix with data of sync blocks of another packing unit.

On the other hand, with respect to audio data, when the SDRAM 75 has stored audio data for one field (one error correction code unit of audio data), the audio data is supplied to an audio processing circuit 78. The audio processing circuit 78 performs predetermined processes such as an audio outer code error correcting process, a de-shuffling process, and an error interpolating process. Thereafter, the audio processing circuit 78 converts the resultant data into serial data and outputs the resultant data to the outside of the IC 60 through a terminal 79.

As described above, one error correction block of audio data is completed with six tracks (one field). Thus, one error correction block is composed of tracks of both forward and backward azimuths. The ECC decoder IC 60 corresponds to one azimuth. To correct an error of audio data with outer code, audio data that has been corrected with inner code should be supplied to the other ECC decoder IC 60' (not shown) corresponding to the other azimuth. Thus, audio data that has been corrected with inner code is supplied to the other ECC decoder IC 60' through a terminal 82.

The terminal 82 allows data to be bidirectionally exchanged. When a mode is set corresponding to a particular method, audio data that is received from the other ECC decoder 60' can be input through the terminal 82.

In addition, an interface 80 to a microcomputer that controls the system is disposed. This microcomputer is referred to as a system controller. The system controller sets various data or reads error information. Moreover, the ECC decoder IC 60 also has a video auxiliary data extracting circuit (not shown) and an audio auxiliary data extracting circuit (not shown). The video auxiliary data extracting circuit extracts video auxiliary data other than video data. The audio auxiliary data extracting circuit extracts extract audio auxiliary data other than audio data. The extracted video auxiliary data and the extracted audio auxiliary data are supplied to the system controller through the interface 80. The ECC decoder IC 60 also has an error counter 73 that counts the number of errors.

The ECC decoder IC 60 exchanges data with the system controller using a bus 81 through the interface 80, the timing generating circuit 64, the error counter 73, the memory controller 74, the outer code decoder 76, the audio processing circuit 78, and the interface 80. The bus 81 has a predetermined bit width. Each of the timing generating circuit 64, the error counter 73, the memory controller 74, the outer code decoder 76, and the audio processing circuit 78 outputs data to the interface 81 through the bus 81.

Figure 4:
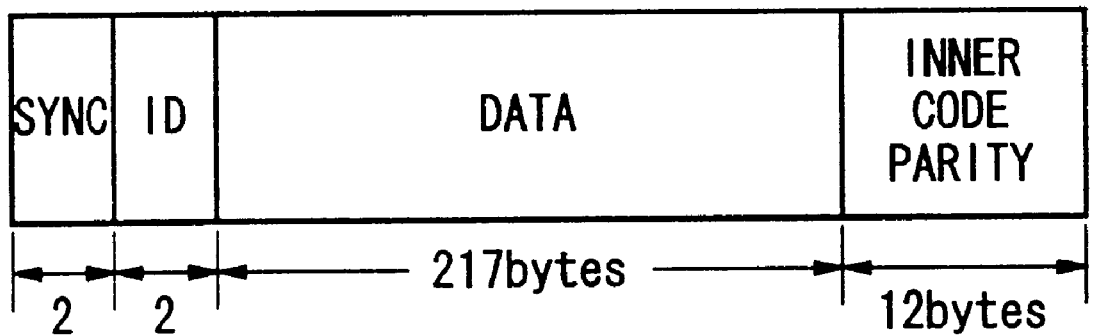
FIG. 4 is a schematic diagram showing the structure of video data of one sync block as an error correction block.
Figure 5A:
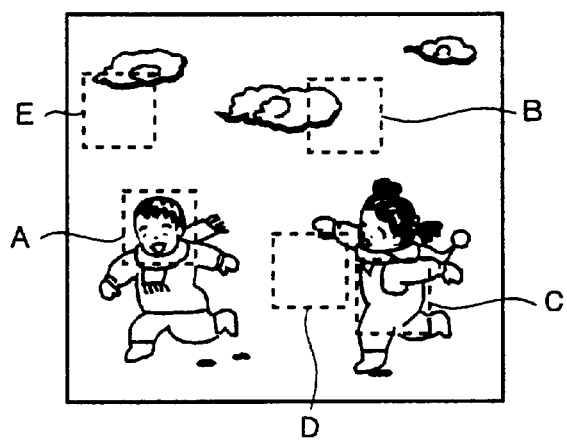
FIGS. 5A and 5B are schematic diagrams for explaining that data amounts of DCT blocks largely vary corresponding to complexities of images.
Figure 5B:
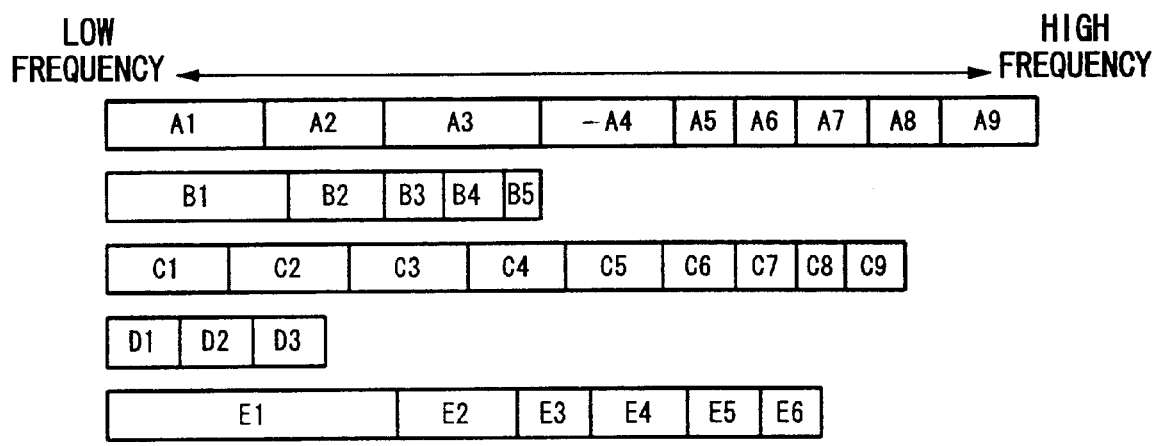
Figure 6A:
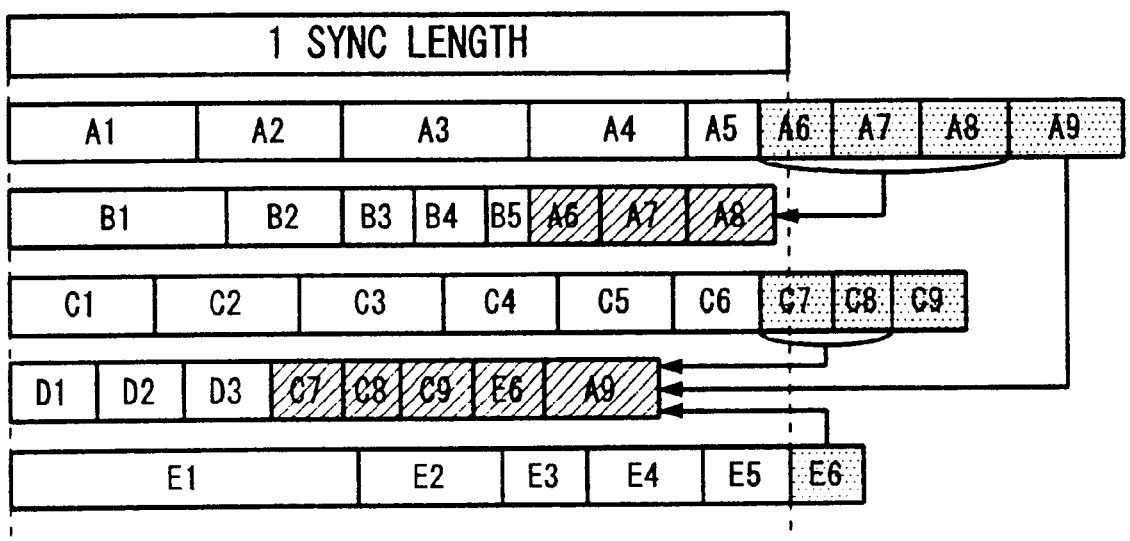
FIGS. 6A and 6B are schematic diagrams showing an example of a method for placing data elements in other sync blocks of a packing unit.
Figure 6B:
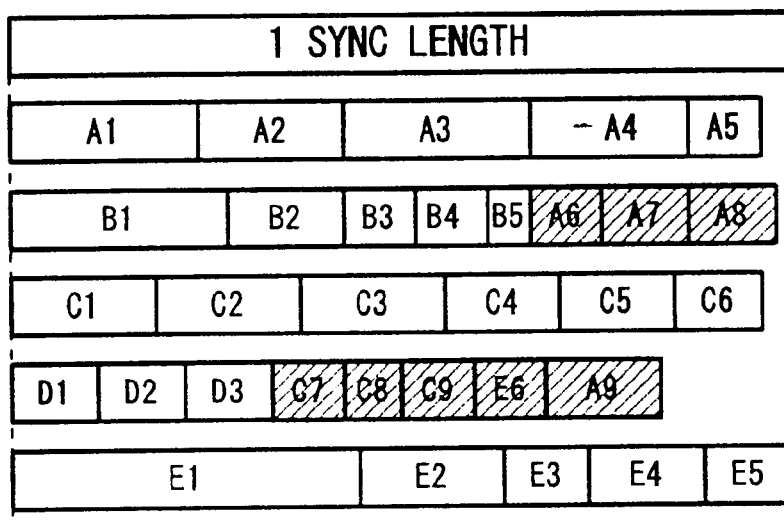
Figure 7:
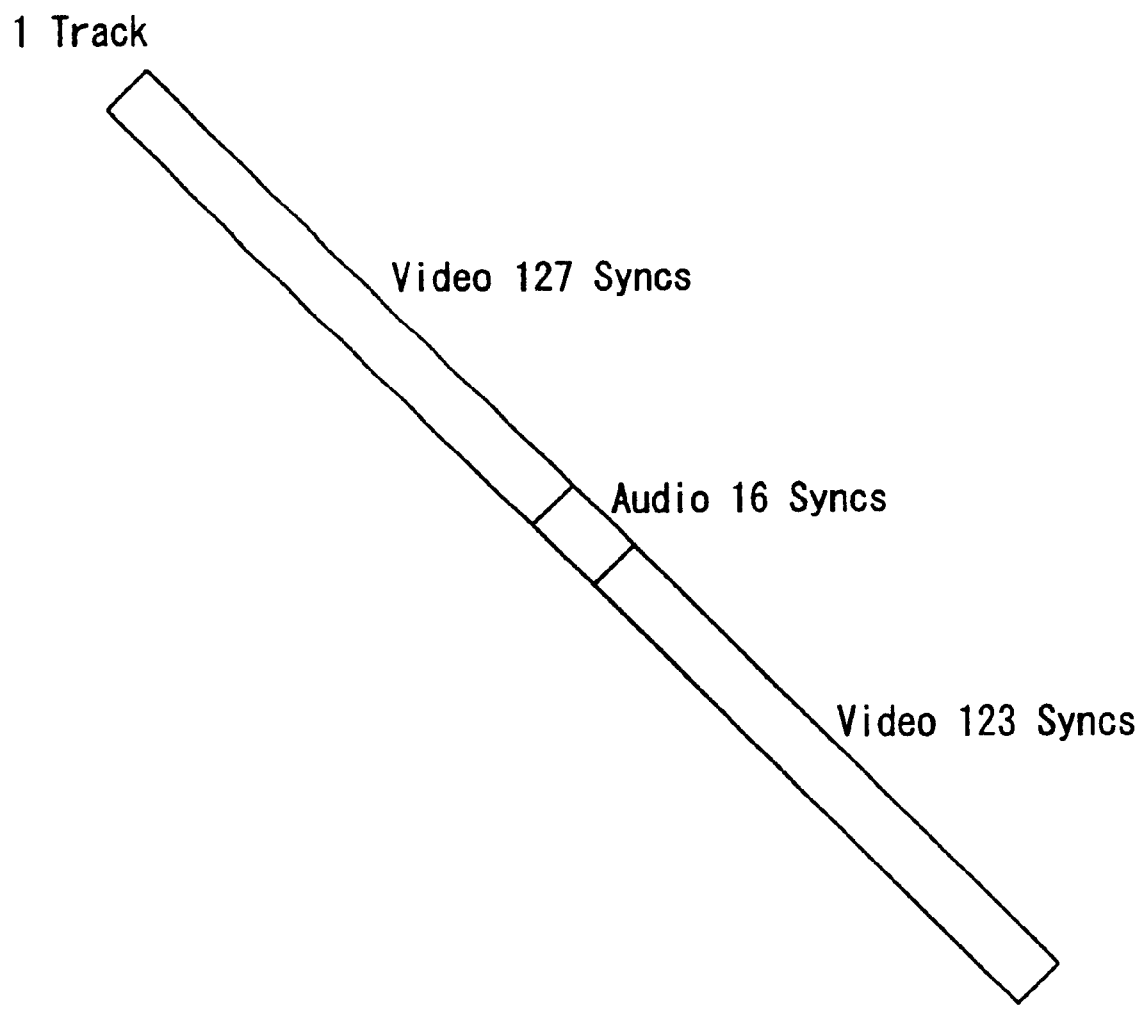
FIG. 7 is a schematic diagram showing the structure of one track.
Figure 8:
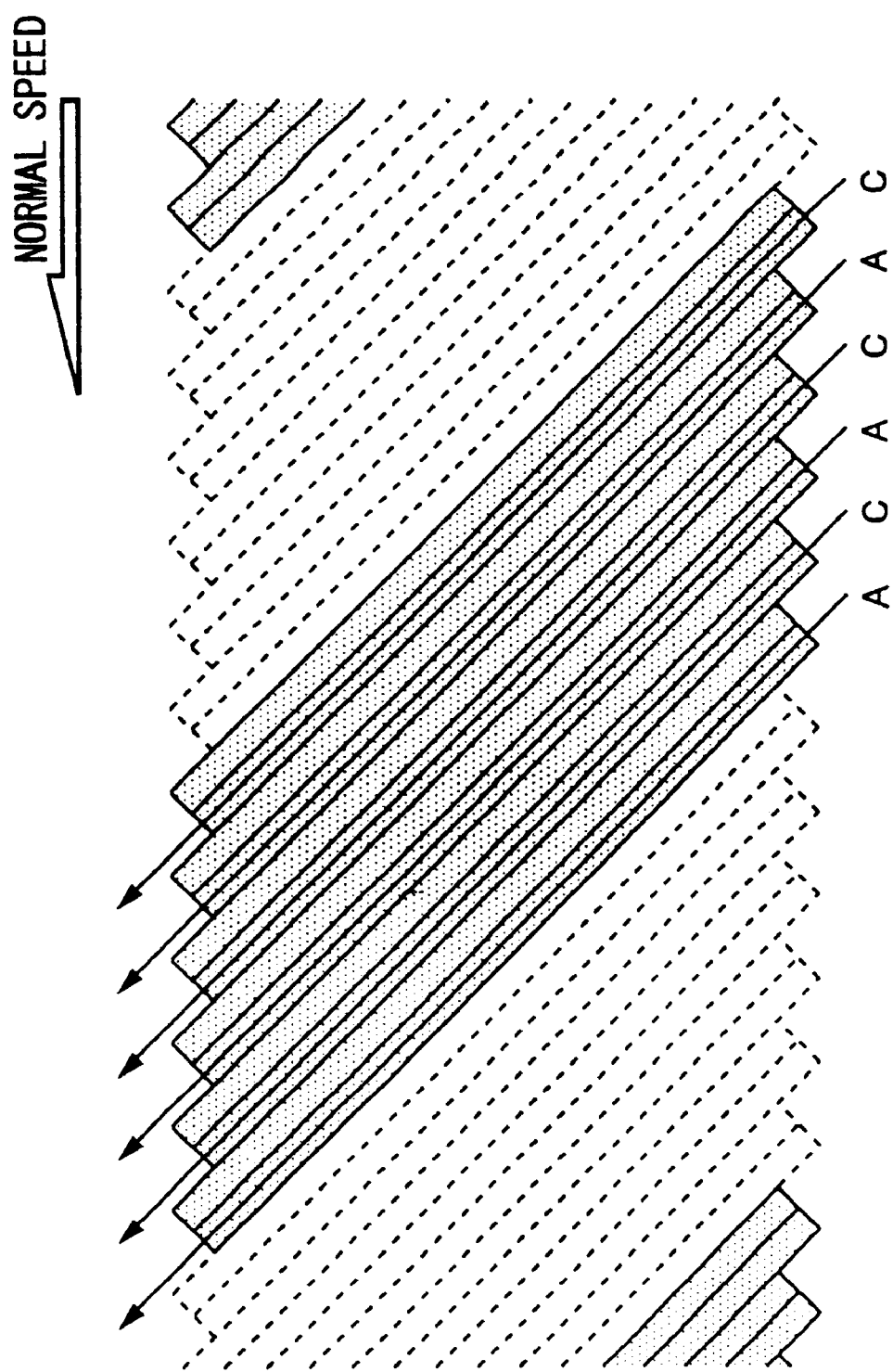
FIG. 8 is a schematic diagram showing a tracing relation between tracks and a magnetic head in a normal reproducing mode.
Figure 16:
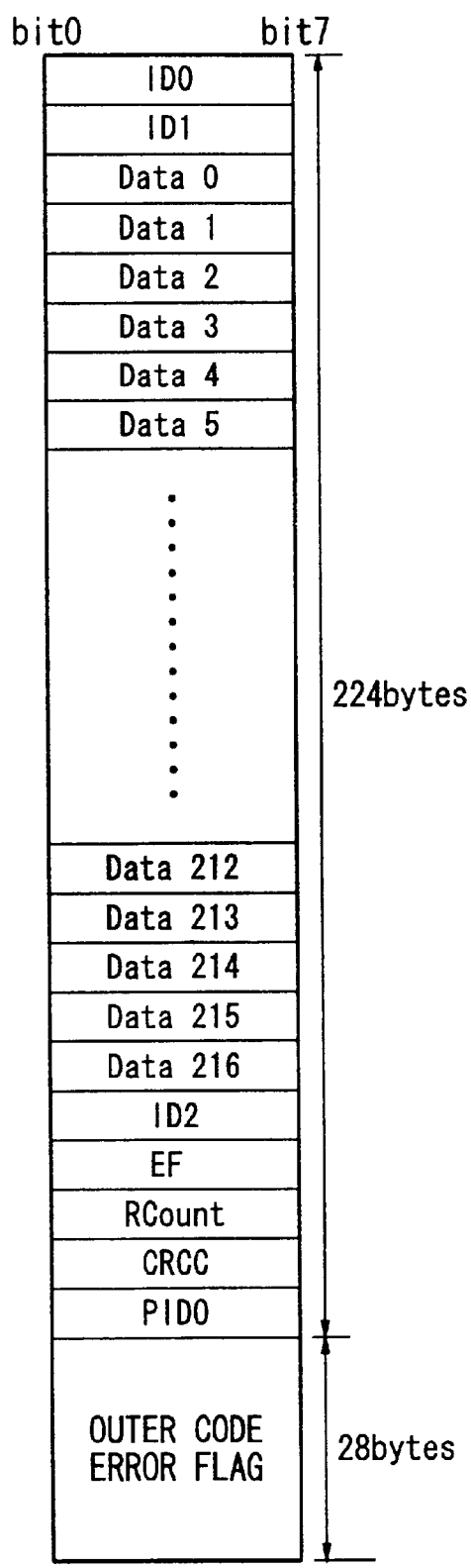
FIG. 16 is a schematic diagram showing an example of the data structure of one packet.

In the ECC decoder IC 60, one sync block is treated as one data packet. FIG. 16 shows an example of the structure of one data packet. In this example, eight bits are treated as one symbol. In FIG. 16, ID0 and ID1 represent detailed information of an ID in the data structure of one sync block shown in FIG. 4. In FIG. 16, ID0 represents a sync block number. ID1 represents a segment number and video/audio identification information. Data 0 to Data 216 represent video data or audio data. Data preceded by Data 216 (namely, ID2 and so forth) represents auxiliary data.

FIG. 17 shows an example of a format of which reproduction data for one sync block is written to the SDRAM 75. Since the SDRAM 75 has a data width of 16 bits, one word is composed of 16 bits. In addition, since the SDRAM 75 has a data width of 16 bits, the number of words of the data format of the SDRAM 75 is the half of the number of words of one data packet shown in FIG. 16.

When the reproduction data is written to the SDRAM 75, the memory controller 74 controls the write timing of the data. The reproduction data is written as video data and audio data for each segment to the SDRAM 75. At this point, the memory controller 74 controls addresses of the SDRAM 75.

FIGS. 18 and 19 show examples of address assignments of the SDRAM 75. FIG. 18 shows an assignment of row addresses. At bits 8 to 10, video data is arranged as segments 0 to 5, whereas audio data is fixed to "6". Thus, at bits 8 to 10, addresses of video data and audio data assigned in such a manner that they do not collide. Bits 6 and 7 of video data represent traveling directions of the tape. In the forward traveling mode, bits 7 and 6 of video data are "0". In the reverse traveling mode, bits 7 and 6 of video data are "1". Bits 0 to 5 represent B7 to B2 of sync block numbers B7 to B0.

Bits 6 and 7 of audio data are fixed to "0". Bits 4 and 5 represent fields 0 to 3. Bits 2 and 3 represent four audio channels. Bits 0 and 1 represent bits 2 and 3 (B2 and B3) of a sync block number.

FIG. 19 shows an assignment of column addresses that are common in audio data and video data. The SDRAM 75 is composed of two banks that are bank A and bank B. Data is assigned to bank A and bank B. In the column address assignment, bits 0 and 1 (B0 and B1) of a sync block number are assigned in such a manner that four sync blocks 0, 1, 2, and 3 mix. S0, S1, S2, and S3 in the column address assignment represent sync blocks of which bits 0 and 1 (B0 and B10 of a sync block number are 0, 1, 2, and 3, respectively.

In a combination of an assignment of sync blocks with bits 0 and 1 of column addresses and an assignment of sync blocks of row addresses, addresses of all sync blocks can be assigned.

ID0 and ID1 shown in FIG. 19 are assigned to column addresses 0 to 3 of bank A. Data 0 to Data 109 are assigned to column addresses 4 to 233. Data 110 to Data 215 are assigned to column addresses 0 to 219 of bank B. Data 216 and ID2 are assigned to column addresses 220 to 223 of bank B.

Error flags as results of the outer code error correcting process are written to column addresses 224 to 251 of bank A and column addresses 224 to 251 of bank B. An error flag is assigned for one bit to one data element. Thus, one word can store error flags for 16 data elements. Consequently, error flags of data elements 0 to 111 are assigned to column addresses 224 to 251 of bank A. Error flags of data elements 112 to 216 are assigned to column addresses 224 to 251 of bank B.

The row addresses and the column addresses of the SDRAM 75 shown in FIGS. 18 and 19 do not change after data that has been corrected with inner code is written to the SDRAM 75 until data is read therefrom.

Next, the controlling process of the memory controller 74 for the SDRAM 75 will be described.

FIGS. 20A, 20B, 20C, 20D, and 20E are timing charts showing an example of an accessing operation of the SDRAM 75 in the normal speed reproducing mode. In FIGS. 20A to 20E, segments 0 to 5 represent areas of the SDRAM 75. Audio 0 to audio 3 represent areas of the SDRAM 75 assigned to one error correction block of audio data.

Figures 20A, 20B, 20C, 20D, 20E:
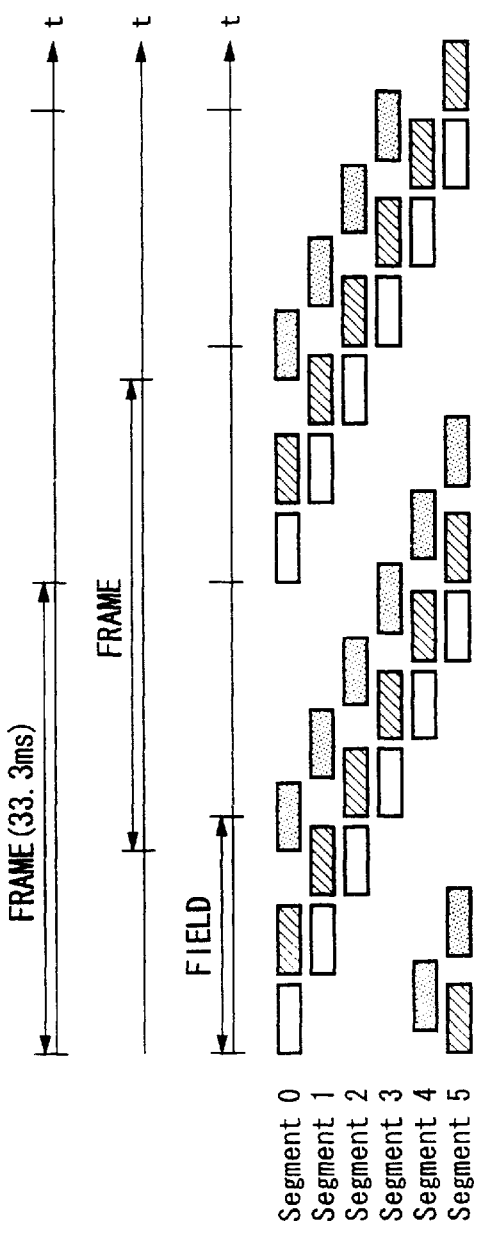
FIGS. 20A, 20B, 20C, 20D, and 20E are time charts showing an example of an accessing operation to the SDRAM in the normal speed reproducing mode.

In FIG. 20A, video data of segments 0 to 5 is supplied to SDRAM 75 in video data write period after the inner code error correcting process. Thereafter, the video outer code decoder 76 performs the reading/writing process for performing the outer code error correcting process. Next, the video data reading process is performed for performing the video data outputting process in video data read period shown in FIG. 20B. As shown in FIG. 20D, the video data reading/writing process of each segment is performed for the SDRAM 75. As shown in FIG. 20C, with respect to audio data, one field is a write/read period. As shown in FIG. 20D, the data writing/reading process of each channel is performed for the SDRAM 75.

Thus, in the normal speed reproducing mode, (1) the video data writing process after the inner code error correcting process, (2) the video data reading process for performing the outer code error correcting process, (3) the video data reading process for performing the video data outputting process, and (4) the audio data writing/reading process are performed in parallel. This is because the internal clock rate of the error correction decoder 9 is converted into a higher clock rate of 46.4 MHz by the rate converter 63 (or 67). Thus, a plurality of processes can be performed on time division basis.

Write timing and output timing of video data that has been corrected with inner code are controlled by an external circuit. The other processes are controlled by the memory controller 74.

FIGS. 21A, 21B, 21C, and 21D show an example of a time division process for writing and reading data to/from the SDRAM 75. FIG. 21A shows a write period of video data and audio data that have been corrected with inner code. FIG. 21B shows a process for video data and audio data. In the case of 30 frames/second, one frame is equivalent to 1,546,872 clock pulses of a clock signal at 46.4 MHz. With the clock signal, the above-described processes are performed every 1008 clock pulses on time division basis. One process sequence is composed of 1008 clock pulses.

According to the present invention, 1008 clock pulses are divided into portions for the individual processes. For example, each of the processes is divided into a sequence of process units so that each process is equally performed with the maximum number of required clock pulses. The maximum number of required clock pulses is referred to as slot. The time division process is performed with slots.

The number of clock pulses that can be divided depends on each process. Thus, the size of each slot depends on each process. As shown in FIG. 21C, in the video data outputting process after the inner code/outer code error correcting process, one slot is composed of 154 clock pulses. In the audio data reading process for performing error correcting process of the audio outer code decoder (not shown), one slot is composed of 16 clock pulses. In the video data writing/reading process for performing the error correcting process of the video outer code decoder 76, one slot is composed of 256 clock pulses. In the A/V data writing process for the SDRAM 75 after the inner code error correcting process, one slot is composed of 582 clock pulses. A method for defining the number of clock pulses for one slot of each process will be described later.

One sequence is composed of all types of slots. By repeating the sequence, each process can be performed on time division basis. In the example shown in FIGS. 21A to 21D, one sequence is composed of 154 clock pulses for the video data outputting process after the inner code/outer code error correcting process, 16 clock pulses for the data reading process for performing the audio outer code error correcting process, 256 clock pulses for the video data reading/writing process for performing the video data outer code error correcting process, and 582 clock pulses for the data writing process after the inner code error correcting process. The order of slots is fixed. The sequence composed of 1008 clock pulses is repeated.

The slot for the video data outputting process after the inner code/outer code error correcting process is placed at the beginning of each sequence because the timing of the video data outputting process depends on a reference frame pulse received from the outside. Each sequence is reset with the reference frame pulse. The next sequence starts from the beginning of a frame. In other words, each sequence starts with the reference frame pulse synchronously.

FIG. 21D shows an example of the number of slots for each process per frame. The video data outputting process after the inner code/outer code error correcting process requires 1400 slots/frame. The data reading process for performing the audio outer code error correcting process requires 1300 slots/frame. The reading/writing process for performing the video data outer code error correcting process requires 1350 slots/frame. The data writing process after the inner code error correcting process requires 1534 slots/frame.

As described above, one frame is composed of 1,546,872 clock pulses. In other words, when one sequence is composed of 1008 clock pulses, one frame contains 1534 sequences. Thus, since 1534 slots/frame are assigned to each process, all the processes can be completed.

Since each process is performed in each sequence, the number of slots assigned to each process becomes the same. However, the number of slots required for each process in one frame is slightly different, blank slots take place. In the blank slots, no process is performed.

Figure 22:
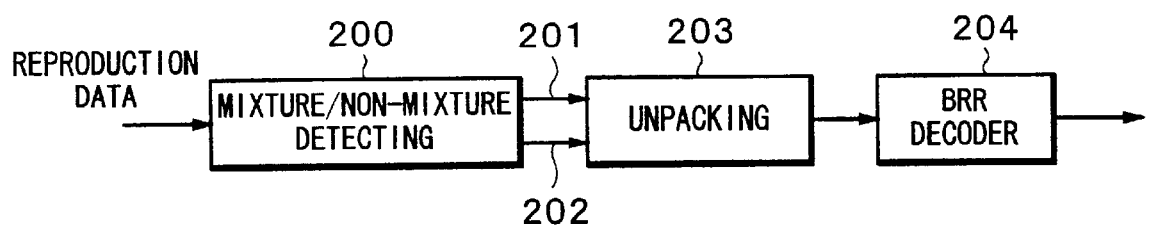
FIG. 22 is a block diagram showing an example of the theoretical structure of a circuit that performs the unpacking process.

As described above, in the embodiment of the present invention, the memory controller 74 of the inner code/outer code decoder 9 performs the unpacking process for reproduction data. Next, the theory of the unpacking process will be described. FIG. 22 shows an example of the theoretical structure of the unpacking process.

In FIG. 22, reproduction data that is read from the magnetic tape is supplied to a mixture/non-mixture detecting portion 200. In the reproduction data, sync blocks have been packed. The packing process is performed when data is recorded. The mixture/non-mixture detecting portion 200 detects whether or not the current packing unit mixes with a data element of a sync block of another packing unit corresponding to sync block numbers of the current packing unit and a segment number. The detected result is supplied as a mixture/non-mixture flag 202 to an unpacking portion 203. The packing unit is supplied to the unpacking portion 203.

The unpacking portion 203 performs an unpacking process for the packing unit 201 corresponding to the mixture/non-mixture flag 202. In other words, when the current packing unit does not mix with a data element of a sync block of another packing unit, the unpacking portion 203 restores a data element that has been temporarily placed in another sync block of the same packing unit to the original sync block and outputs the resultant packing unit as normal DCT blocks. On the other hand, when the current packing unit mixes a data element of a sync block of another packing unit, the unpacking portion 203 discards a sync block that has a data element of another packing unit. Thus, the unpacking portion 203 outputs imperfect DCT blocks without high frequency components.

According to the present invention, the mixture/non-mixture detecting portion 200 detects whether or not the current packing unit mixes with a data element of a sync block of another packing unit. When the current packing unit mixes with a data element of a sync block of another packing unit, the unpacking portion 203 discards a sync block that has a data element of a sync block of another packing unit. Thus, packing units are inhibited from mixing.

Reproduction data that has been unpacked by the unpacking portion 203 is supplied to a BRR decoder 204. Since the reproduction data received from the unpacking portion 203 does not mix with a data element of a sync block of another packing unit, the BRR decoder 204 performs the decompressing process for the reproduction data.

Figures 2A, 2B:
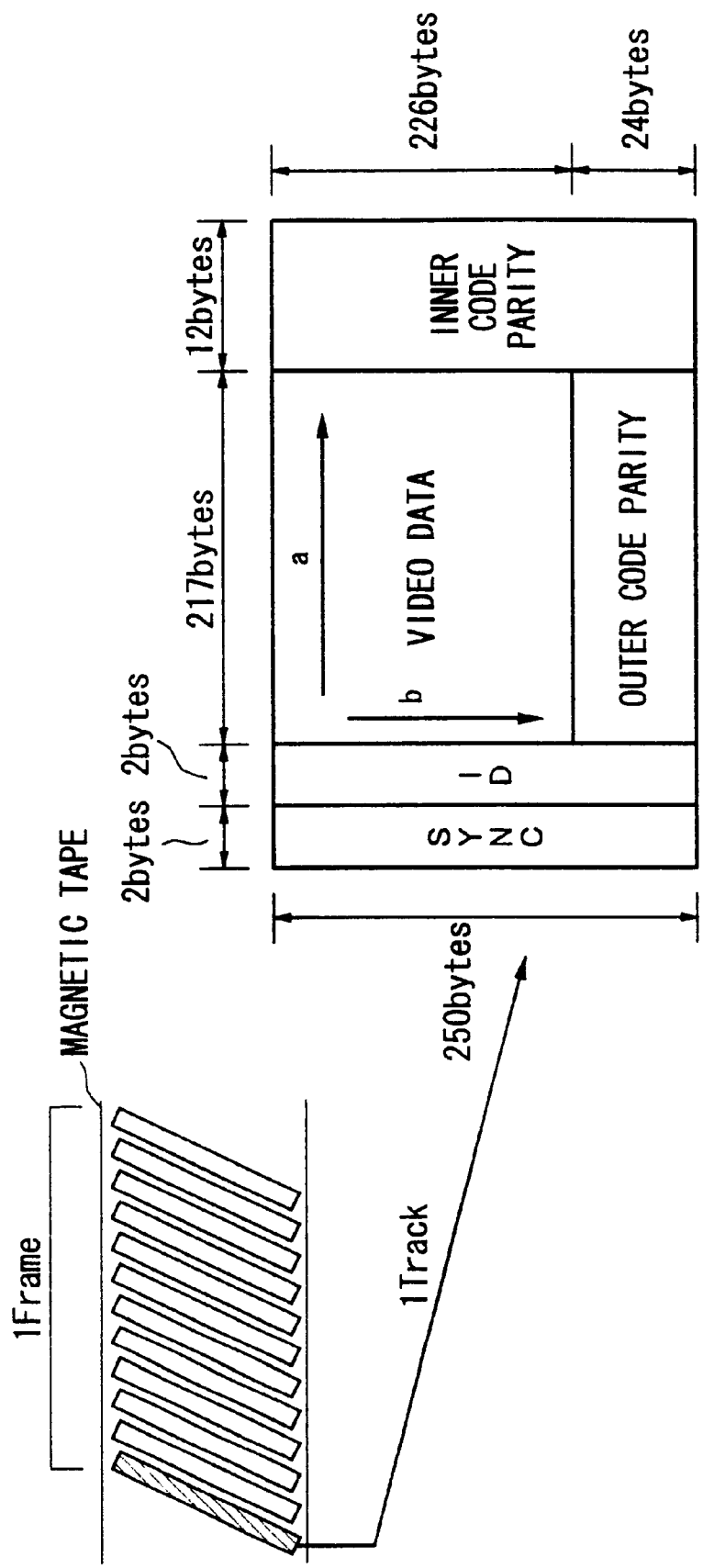
FIGS. 2A and 2B are schematic diagrams showing an example of the structure of an error correction block.

Next, the process for inhibiting packing units from mixing will be described. The mixture/non-mixture detecting portion 200 and the unpacking portion 203 correspond to the memory controller 74 shown in FIG. 2. The process for detecting whether or not packing units mix is performed by detecting data that is input to/output from the memory controller 74 and data that is read from/written to the SDRAM 75 under the control of the memory controller 74.

First of all, with reference to FIGS. 23A, 23B, 23C, 23D, 23E, and 23F, individual cases of which packing unit mixture inhibiting process is not performed will be described. As typical examples of which the current packing unit tends to mix with a data element of a sync block of another packing unit, cases of which a writing packing unit overlaps with a reading packing unit will be considered. In FIGS. 23A to 23F, squares represent sync blocks of packing units. Numbers assigned individual sync blocks represent sync block numbers of packing units. Sync blocks of the same packing unit are denoted with the same pattern.

In each of FIGS. 23A to 23F, the upper portion represents a timing of which reproduction data read from the magnetic tape 6 is written to the SDRAM 75. This timing varies. The lower portion represents a timing of which data that is read from the SDRAM 75 is supplied to the downstream circuit (BRR decoder 11). In other words, sync blocks shown in the lower portion are supplied to the BRR decoder 11. This timing depends on the clock signal on the output side. Thus, this timing does not vary. The output timing of sync blocks is controlled independently from reproduction data supplied to the memory controller 74.

FIG. 23A shows the case that after data is read from the SDRAM 75 to the downstream circuit, data is written to the SDRAM 75. In this case, since data that has been written to the SDRAM 75 is read, the read timing does not collide with the write timing. Thus, no problem takes place. FIG. 23B shows the case that just before data is read from the SDRAM 75 and supplied to the downstream circuit, reproduction data is written to the SDRAM 75. In this case, since newly written data is supplied to the downstream circuit, no problem takes place.

FIG. 23C shows the case that data that is read from the SDRAM 75 is overtaken by data that is written to the SDRAM 75. This case takes place for example in a high speed reproducing mode. FIG. 23D shows the case that data that is read from the SDRAM 75 overtakes data that is written to the SDRAM 75. In the cases shown in FIGS. 23C and 23D, the second and third sync blocks of the writing packing unit mix with those of the reading packing unit. Thus, when these packing units are unpacked by the unpacking portion 203 and decompressed by the BRR decoder 11, a correct image cannot be obtained.

On the other hand, FIG. 23E shows the case that the first and second sync blocks of a packing unit cannot be reproduced from the magnetic tape 6. In other words, only the third to fifth sync blocks of the packing unit are written to the SDRAM 75. In contrast, FIG. 23F shows the case that third to fifth sync blocks of a packing unit cannot be reproduced. In other words, only the first and second sync blocks of the packing unit are written to the SDRAM 75. As with the cases shown in FIGS. 23C and 23D, the cases shown in FIGS. 23E and 23F tend to take place in a high speed reproducing mode.

Figure 23:
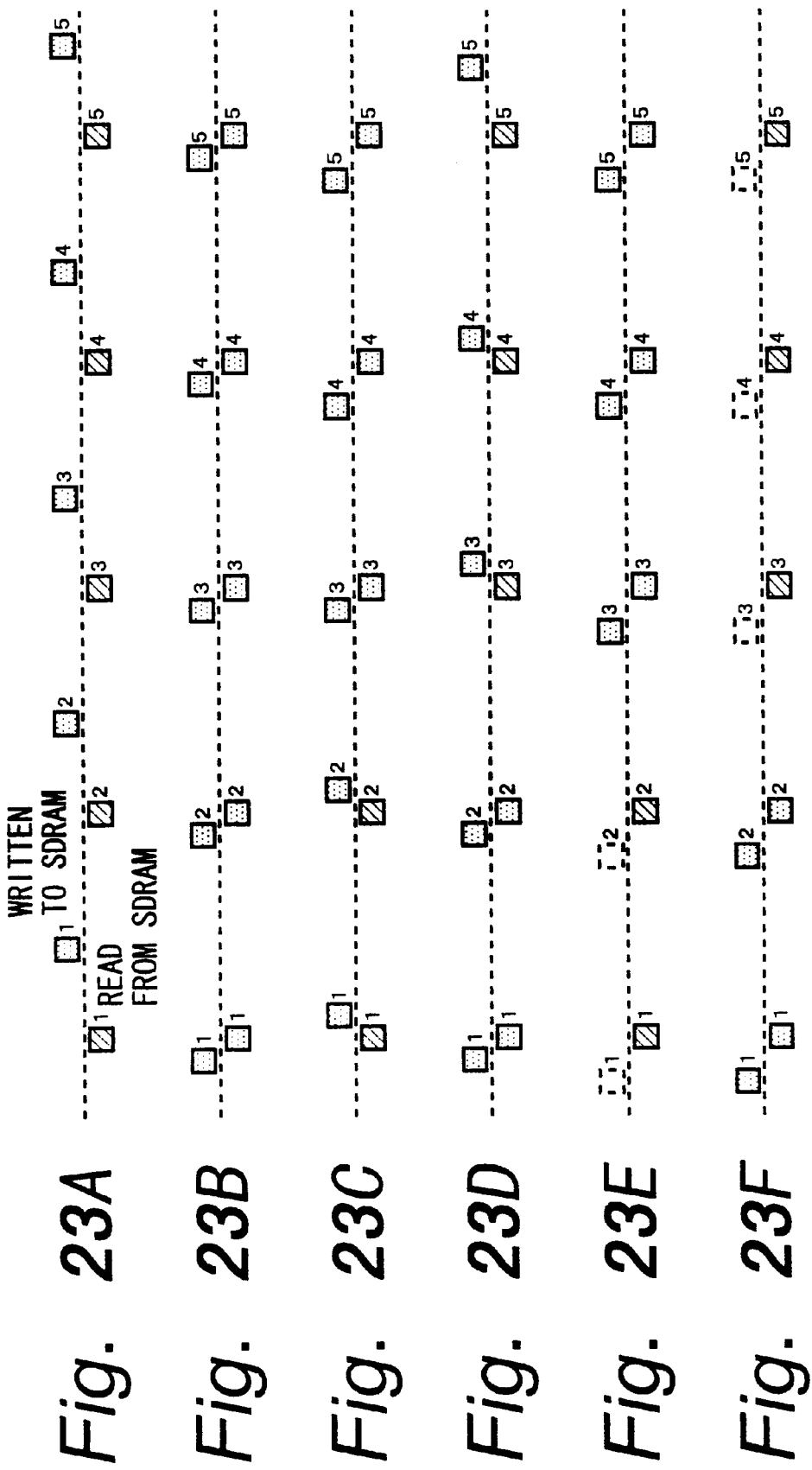
Figure 24:
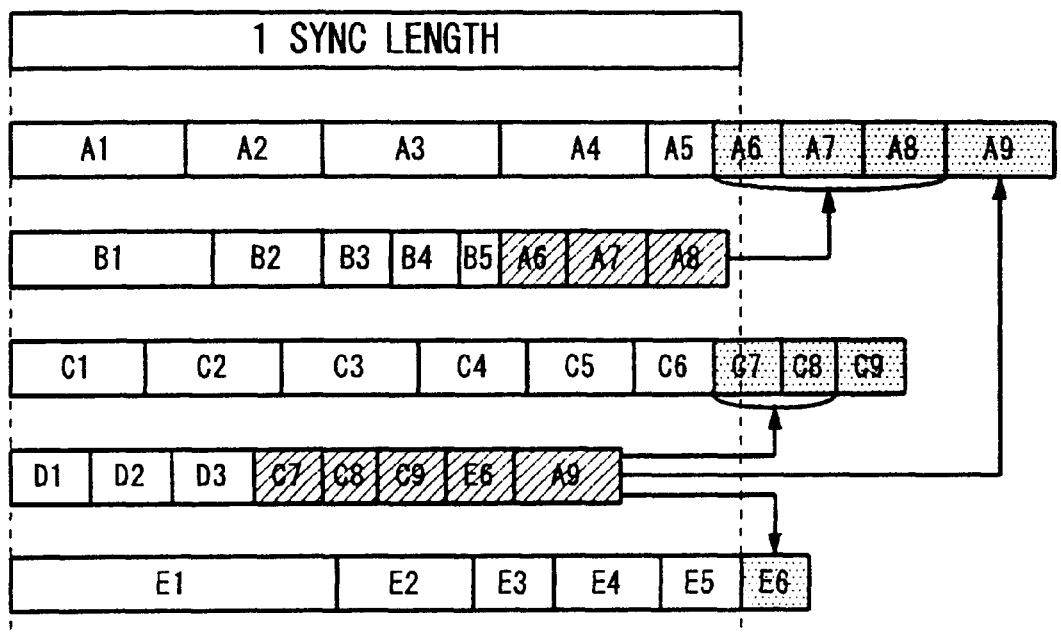
FIG. 24 is a schematic diagram for explaining the unpacking process for a packing unit so as to perform a decompressing process.
Figure 25:
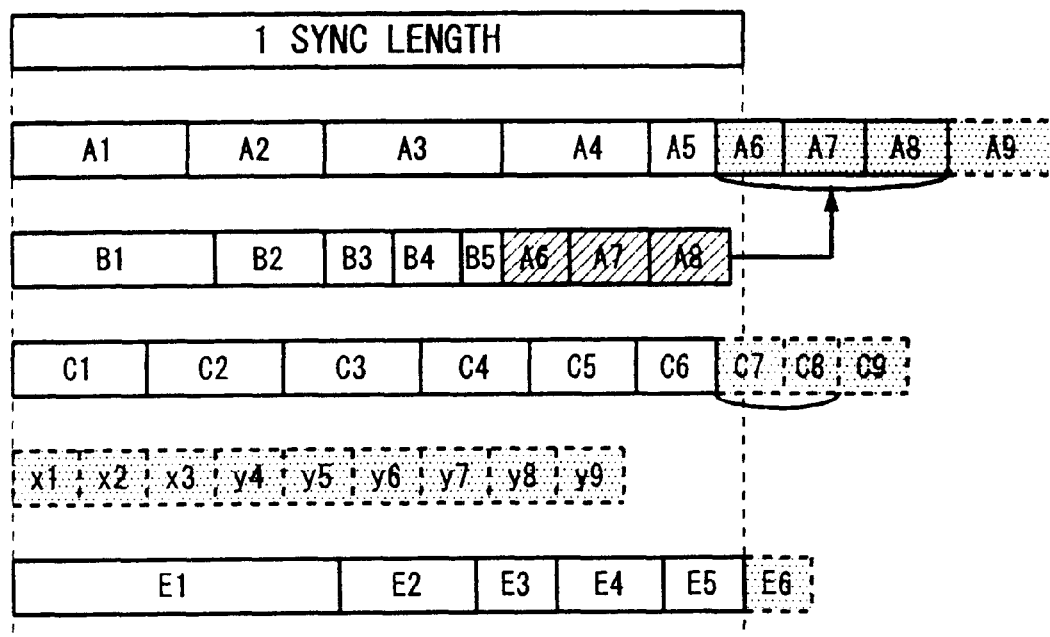
FIG. 25 is a schematic diagram for explaining the unpacking process for a packing unit so as to perform a decompressing process.

In the cases shown in FIGS. 23A and 23B, as shown in FIG. 24, data elements that have been temporarily placed in other sync blocks are restored to the original sync blocks. Thus, since the BRR decoder 11 can perform the decompressing process with high frequency components, an image in high quality can be obtained. In the cases shown in FIGS. 23C to 23F, since the current packing unit mixes with a data element of a sync block of another packing unit, as shown in FIG. 25, a sync block that has a data element of a sync block of another packing unit is discarded as error data corresponding to a means of the present invention. Thus, the BRR decoder 11 performs the decompressing process without such a sync block.

Figure 26:
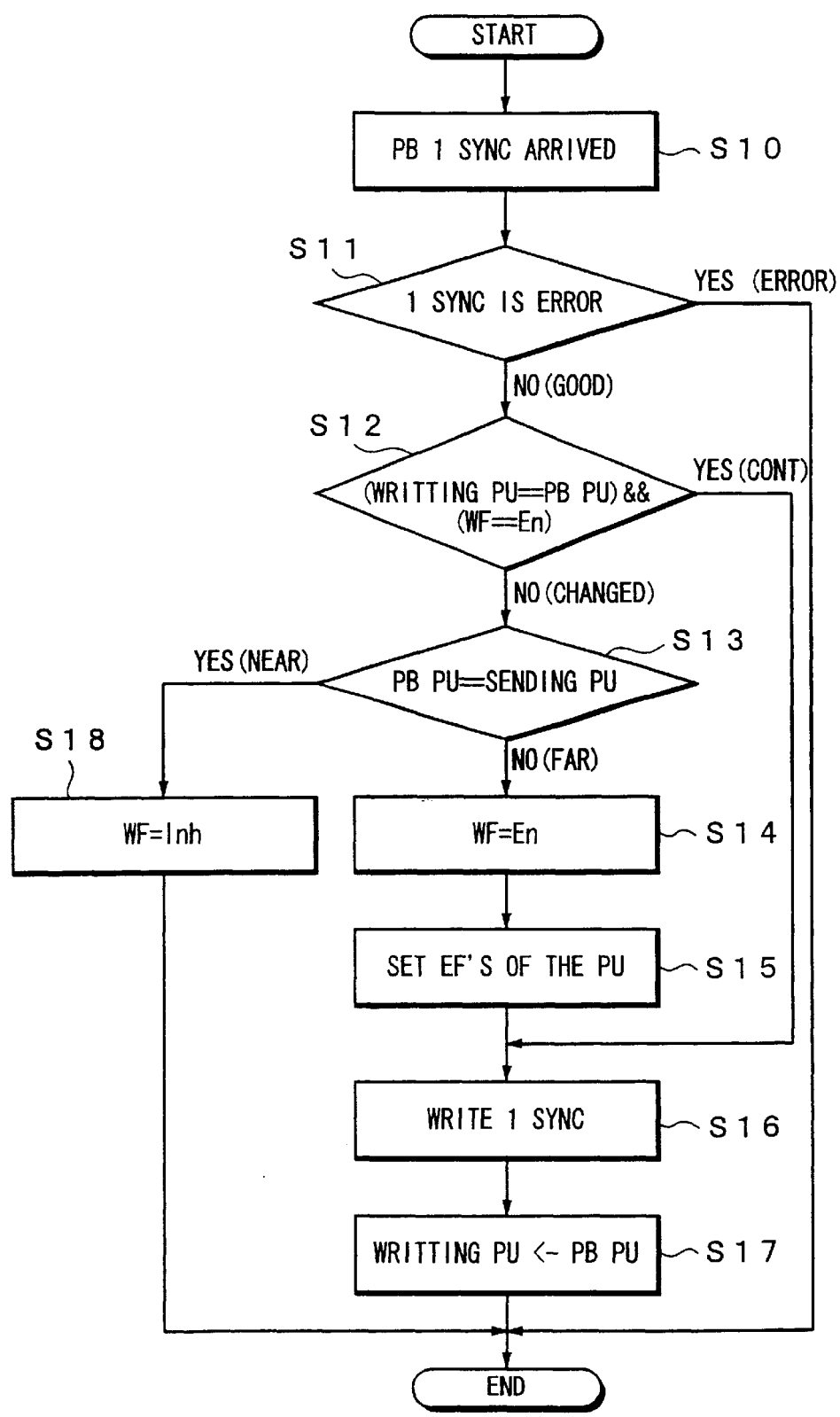
FIG. 26 is a flow chart showing a packing unit mixture inhibiting process according to the present invention.

According to the present invention, the memory controller 74 controls a packing unit mixture inhibiting process. FIG. 26 is a flow chart showing the packing unit mixture inhibiting process.

In the following description, PU represents a packing unit number. The memory controller 74 identifies each packing unit corresponding to a packing unit number PU assigned thereto. WF represents a write inhibition flag that inhibits data from being written to the SDRAM 75. In the initial state, for safety, the write inhibition flag is set to the write inhibition state (inhibit). A packing unit that is corrected with inner code by the inner code decoder 69 and supplied to the memory controller 74 is referred to as PB packing unit (PB PU). In addition, a packing unit written from the memory controller 74 to the SDRAM 75 is referred to as writing packing unit. The information of these packing units is stored in a particular register of the memory controller 74 corresponding to a packing number PB assigned thereto.

In the flow chart shown in FIG. 26, when one sync block of data is read as reproduction data from the magnetic tape 6. The reproduction data is corrected with inner code by the inner code decoder 69. The resultant data is supplied to the memory controller 74. As this point, the process shown in FIG. 28 is started (at step S10). At step S11, it is determined whether or not the sync block is error data. When the sync block is error data, the sync block is discarded. In this case, the process is completed. When the next reproduction data is received, the process is started.

At step S11, when the sync block is not error data, the flow advances to step S12. At step S12, it is determined whether or not data of a writing packing unit that is being written to the SDRAM 75 is the same as data of a PB packing unit that is being received by the memory controller 74. In addition, it is determined whether or not the write inhibition flag WF is enable (EN). When both the determined results are Yes, the flow advances to step S16. At step S16, the writing sync block is written to the SDRAM 75.

When both the determined results at step S12 are No, the flow advances to step S13. The transition from step S12 to step S13 represents that the writing packing unit written to the SDRAM 75 changes. At step S13, it is determined whether or not the PB packing unit is the same as the packing unit (output data) that is being sent from the memory controller 74 to the downstream circuit (BRR decoder 11).

When the determined result at step S13 is Yes (namely, five sync blocks including the sending sync block are being sent), the flow advances to step S18. At step S18, the PB sync block is discarded. In addition, the write inhibition flag WF is set to Inh (inhibition). Thereafter, the process is completed. When the next reproduction data is received, the process is started.

At steps S13 and S18, the newly supplied packing unit is suppressed from being written to the SDRAM 75. Thereafter, packing units that have been written to the SDRAM 75 are read and output from the memory controller 74. Thus, data can be prevented from being overtaken in the middle of the data sending operation.

When the determined result at step S13 is No (namely, the PB packing unit that has been received by the memory controller 74 is not the same as the packing unit of the output data that is being sent from the memory controller 74 to the downstream circuit), the flow advances to step S14. At step S14, the write inhibition flag WF is set to En.

At step S15, to prevent the current packing unit (five sync blocks) from mixing with data of an old packing unit that has been written to the SDRAM 75, a process for discarding all five sync blocks of the old packing unit is performed. In the embodiment, inner code error correction error flags of the five sync blocks are set to the error state. In the example shown in FIG. 19, an error flag written at a relevant position of the column addresses 224 to 251 of the bank A or bank B is set to an error state.

When the error flag of the SDRAM 75 is set to the error state, the same effect as the declaration of invalidation of relevant sync blocks is obtained. Thus, the sync blocks are discarded. Consequently, when a part of sync blocks of a packing unit cannot be read from the magnetic tape 6 as with the cases shown in FIGS. 23E and 23F, the sync blocks of the packing unit can be prevented from mixing with data elements of sync blocks of another packing unit. When the error flag is set, the flow advances to step S16.

At step S16, one sync block is written to the SDRAM 75. At step S17, a packing unit with a packing unit number written at step S16 is stored as a writing packing unit. In other words, at step S17, the PB packing unit is treated as a new writing packing unit. Thus, the process is completed. When the next reproduction data is received, the process is started.

FIGS. 27A, 27B, 27C, 27D, 27E, and 27F show cases of which the process of the flow chart shown in FIG. 26 is performed. FIGS. 27A to 27F correspond to FIGS. 23A to 23F that represent the cases of which the packing unit mixture inhibiting process is not performed. FIGS. 27A to 27F show the cases of which a writing packing unit overlaps with a reading packing unit overlap.

In each of FIGS. 27A to 27F, reproduction data supplied to the memory controller 74, state of write inhibition flag WF, data written to the SDRAM 75, data read from the SDRAM 75 to the downstream circuit, and data (stock data) written to the SDRAM 75 are successively represented. The write inhibition flag WF represents write inhibition state in high level.

Sync blocks are represented with squares. Numbers added to squares represent sync blocks of one packing unit. The same number represents the address of the SDRAM 75. Different patterns of squares (hatched squares, white squares, and shaded squares) represent different packing units.

After reproduction data is received by the memory controller 74 until it is written to the SDRAM 75, a time lag takes place to some extent. In addition, as shown in FIGS. 22 and 23, after data that has been decoded with inner code is written to the SDRAM 75 until the data is read from the SDRAM 75, a time lag for around one field takes place.

The cases shown in FIGS. 27A and 27B correspond to the cases shown in FIGS. 23A and 23B, respectively. In the example shown in FIG. 27A, when reproduction data is received by the memory controller 74, since a packing unit of the reproduction data is the same as a packing unit that is read from the SDRAM 75 (this packing unit is referred to as output data), the flow shown in FIG. 26 advances from step S13 to S18. At step S18, the write inhibition flag WF is set to Inh. Thus, since the reproduction data is inhibited from being written to the SDRAM 75, data of one frame prior is read from the SDRAM 75 without a mixture of a data element of a sync block of another packing unit.

The fifth sync block of the output data is completed before the fifth sync block of the reproduction data starts. Thus, at the next timing, a different packing unit is output. Consequently, since a packing unit of the reproduction data is different from a packing unit of the output data, the flow advances from step S13 to step S14. At step 14, the write inhibition flag WF is set to En (write enable state). In this case, the first to fourth sync blocks of the new packing unit of the reproduction data are discarded.

In the example shown in FIG. 27B, the write inhibition flag WF has been set to En. Corresponding to the determined result at step S12, the flow advances to step S16. At step S16, reproduction data for five sync blocks of the current packing unit is written to the SDRAM 75. When the next packing unit is received, the packing unit of the output data is different from the packing unit of the reproduction data. Thus, corresponding to the determined result at step S13, the write inhibition flag WF is set to Inh. When the next packing unit of the reproduction data is received, corresponding to the determined result at step S12, the flow advances to step S13. Since the output data is not the next packing unit, the packing unit of the reproduction data is different from the packing unit of the output data. Thus, the flow advances to step S14. At step S14, the write inhibition flag WF is set to En. In the example shown in FIG. 27B, this process is repeated. Thus, the reproduction data is read without a mixture of a data element of a sync block of another packing unit.

The cases shown in FIGS. 27C and 27D correspond to the cases shown in FIGS. 23C and 23D, respectively. In the cases shown in FIGS. 27C and 27D, output data is overtaken by reproduction data. In the case shown in FIG. 27C, since a packing unit of the reproduction data is the same as a packing unit of the output data, at steps S13 and S18, the write inhibition flag WF is set to Inh. Thus, the reproduction data is inhibited from being written to the SDRAM 75. Thus, in this case, until the packing unit of the reproduction data changes, this state continues. Consequently, the packing unit of one frame prior is output without a mixture of a data element of a sync block of another packing unit.

In the example shown in FIG. 27D, although the same data as the reproduction data is read from the SDRAM 75, the output data is overtaken by the reproduction data. In this case, since the conditions at step S12 are satisfied, data is continuously written to the SDRAM 75.

The cases shown in FIGS. 27E and 27F correspond to the cases shown in FIGS. 23E and 23F, respectively. FIG. 27E shows the case of which first and second sync blocks of a packing unit are not read from the magnetic tape. FIG. 27F shows the case of which third to fifth sync blocks of a packing unit are not read from the magnetic tape. In the case shown in FIG. 27E, while the reproduction data is not being read, data of one frame prior is read and output from the SDRAM 75. When reproduction data is received in the middle of a packing unit, since a packing unit of the reproduction data is the same as a packing unit of the output data, at steps S13 and S18, the write inhibition flag WF is set to Inh. Thus, the reproduction data is not written to the SDRAM 75. Thus, a packing unit of one frame prior is output without a mixture of a data element of a sync block of another packing unit.

In the example shown in FIG. 27F, the write inhibition flag WF has been set to En. At step S15, the error flag is set to the packing unit. When the reproduction data cannot be obtained, corresponding to the determined result at step S1, other steps are skipped. In addition, since the error flag has been set to the packing unit, the packing unit is not output. Thus, data of another packing unit can be prevented from mixing with data of another packing unit.

Thus, according to the present invention, in all the cases of which a writing packing unit overlaps with a reading packing unit, the current packing unit can be prevented from mixing with data of a sync block of another packing unit.

FIGS. 28A, 28B, 28C, 28D, and 28E show cases of which a writing packing unit and a reading packing unit do not overlap or less overlap. In reality, packing units hardly overlap. Instead, the probability of which the cases shown in FIGS. 28A to 28E take place is high.

Figure 28A:
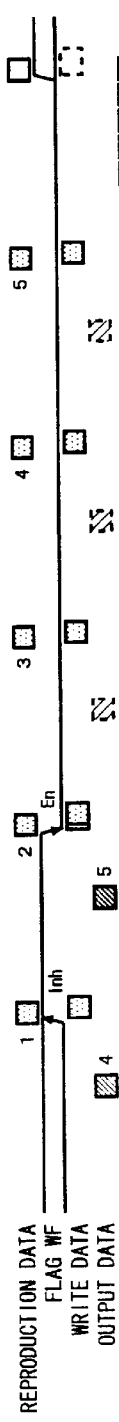

FIG. 28A shows a case that a start portion of a packing unit of output data overlaps with a last portion of a packing unit of reproduction data. In this case, when a packing unit of output data changes, the packing unit of reproduction data is different from a packing unit of the output data. Thus, at steps S13 and S14, the write inhibition flag WF is set to En. Thus, data after the second sync block is written to the SDRAM 75. Data after the next packing unit is read from the SDRAM 75.

Figure 28B:

FIG. 28B shows a case of which a packing unit of reproduction data does not completely overlap with a packing unit of output data. In reality, the probability of which this case takes place is the highest. In this case, reproduction data is written to the SDRAM 75 corresponding to the flow chart shown in FIG. 26. The output data is properly read.

Figure 28C:
Figure 28D:
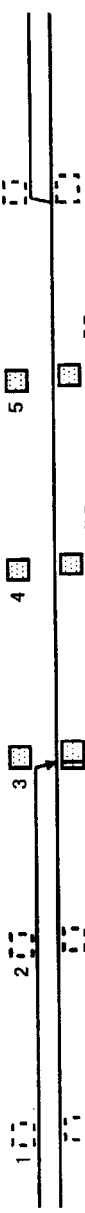
Figure 28E:

FIG. 28C shows a case that sync blocks supplied are all error sync blocks. FIG. 28D shows a case that the first and second sync blocks of a packing unit are error sync blocks. FIG. 28E shows a case that the third and fourth sync blocks of a packing unit are error sync blocks. Corresponding to the determined result at step S11, other steps are skipped. Thus, the error data is not written to the SDRAM 75. When data is normally written in another sequence, an error flag is written to each packing unit at step S15. Thus, data is read without a mixture of a data element of a sync block of another packing unit (for example, a packing unit of two frames prior).

Thus, in the examples shown in FIGS. 28D and 28E, error data of two sync blocks is lost. Consequently, although the image quality deteriorates, since data of packing units does not mix, the BRR decoder 11 properly performs the decompressing process.

Figure 9:
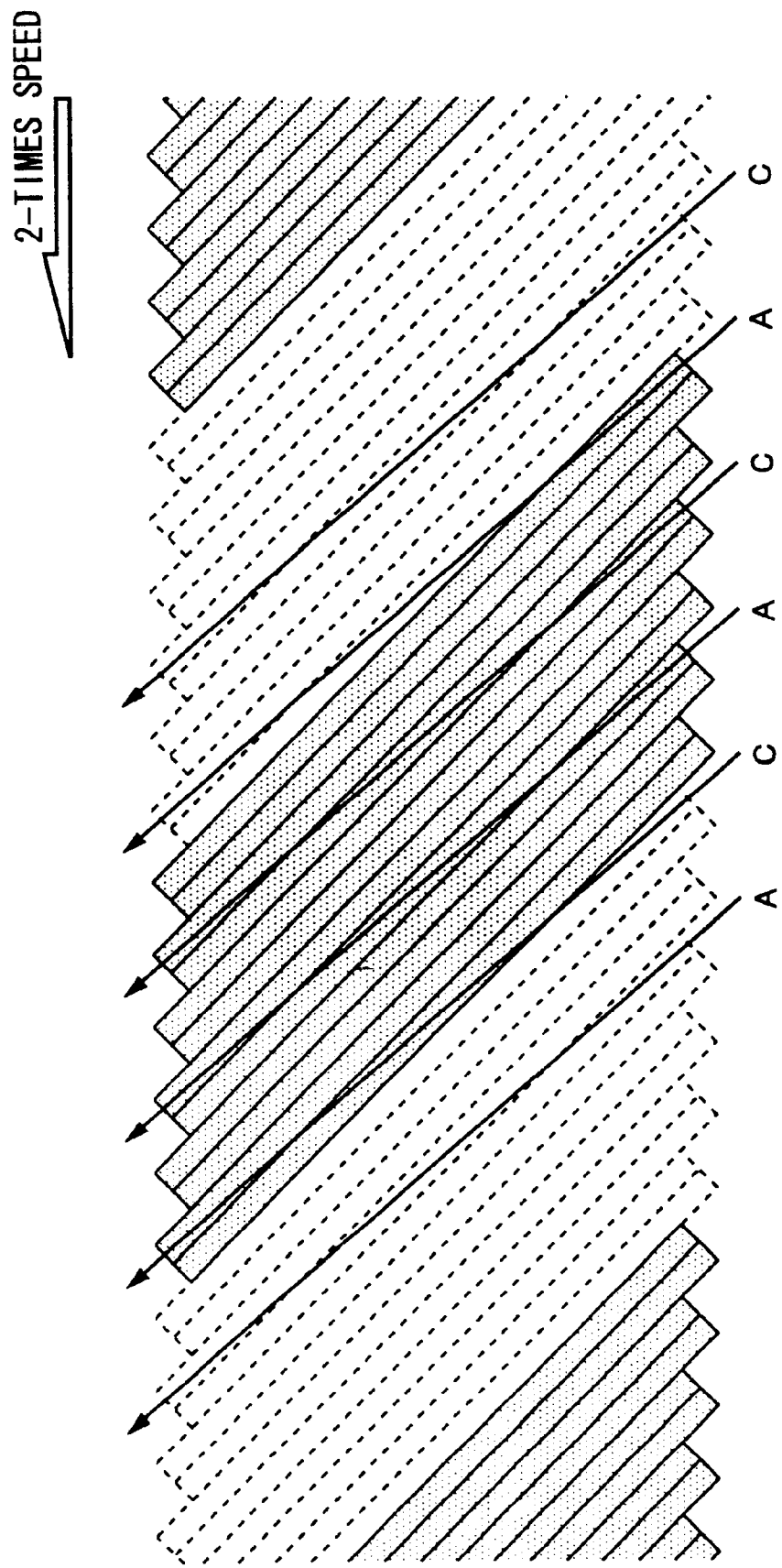
FIG. 9 is a schematic diagram showing a tracing relation between tracks and a magnetic head in a 2-times speed variable-speed reproducing mode.
Figure 10:
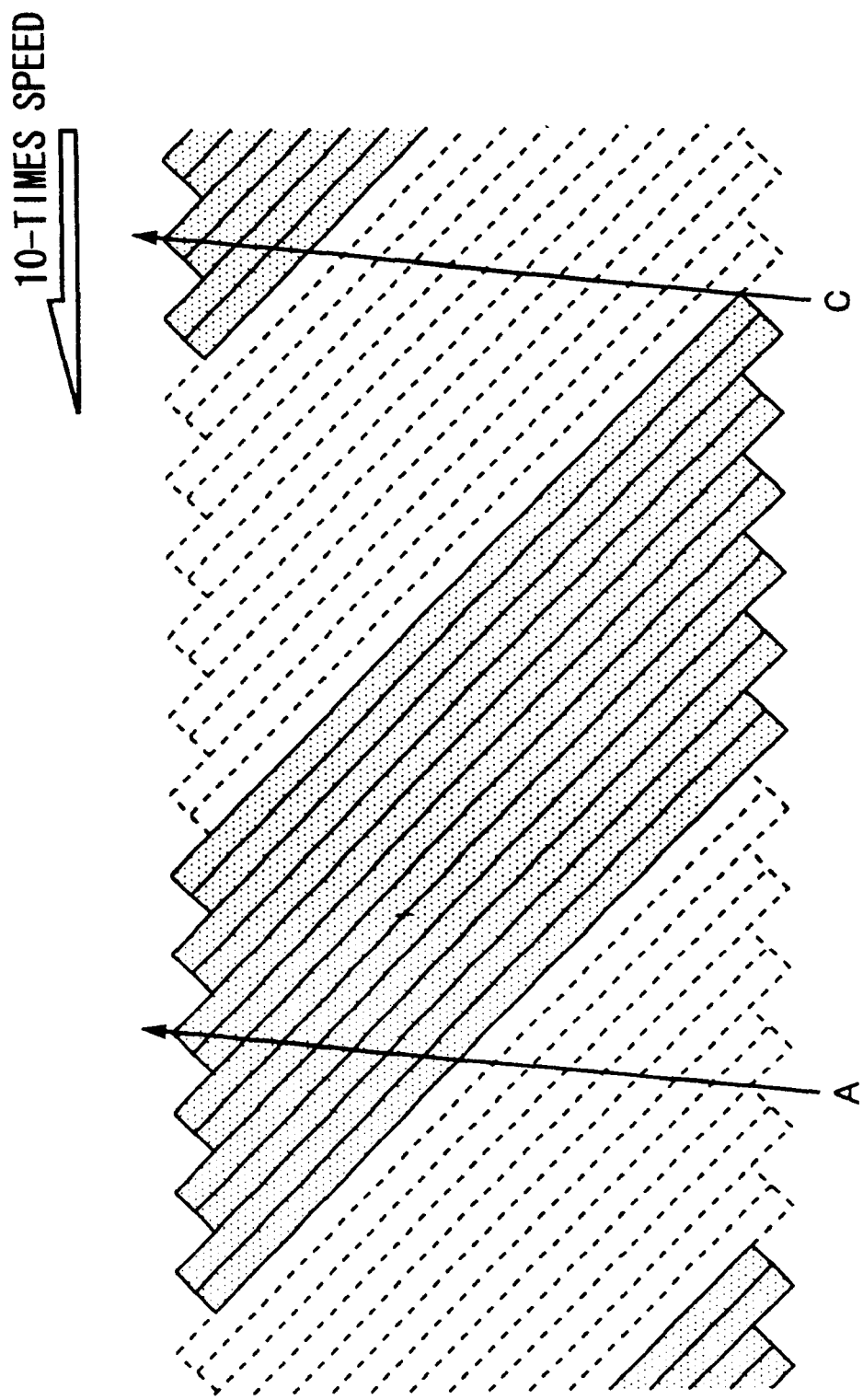
FIG. 10 is a schematic diagram showing a tracing relation between tracks and a magnetic head in a 10-times speed variable-speed reproducing mode.
Figure 11:
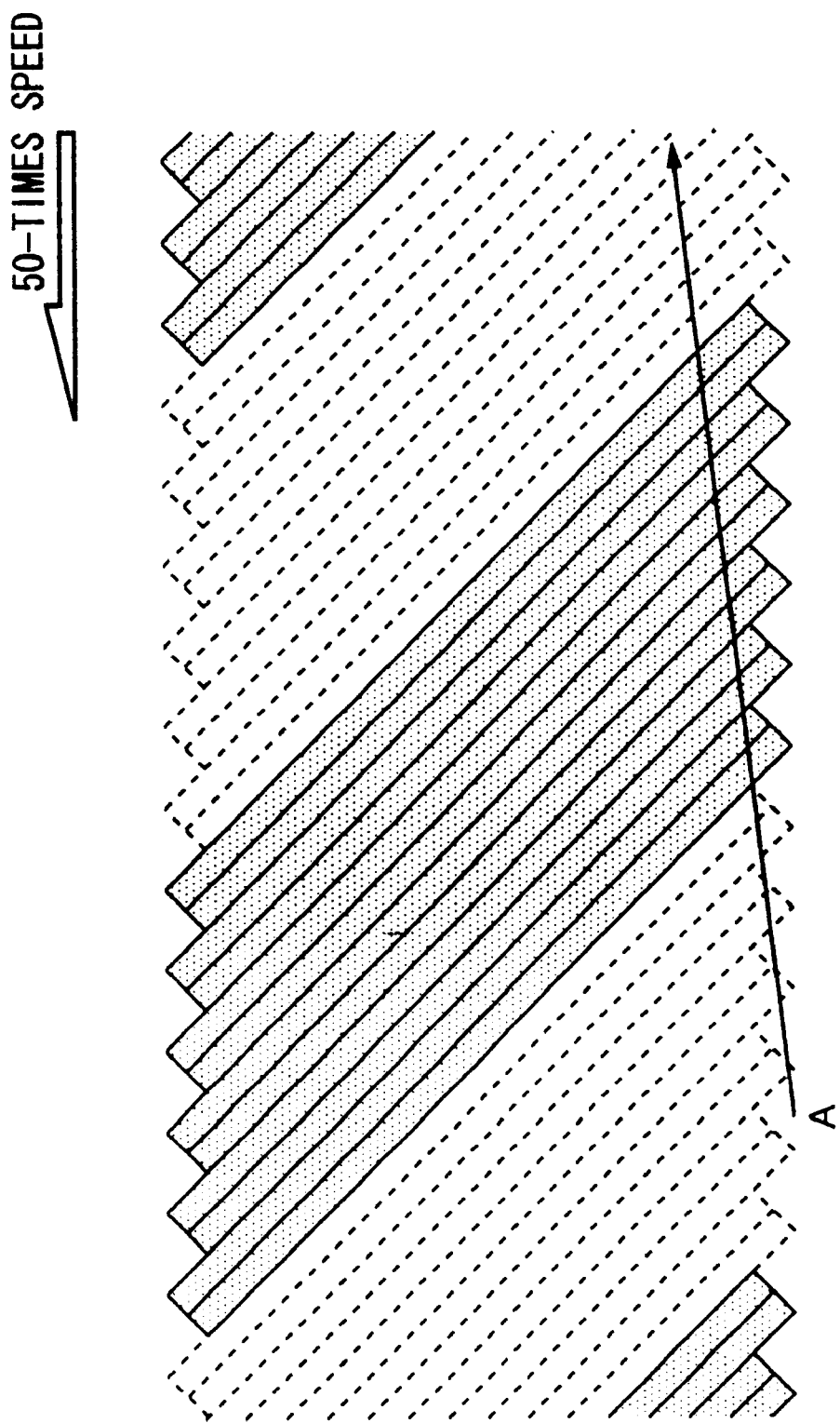
FIG. 11 is a schematic diagram showing a tracing relation between tracks and a magnetic head in a 50-times speed variable-speed reproducing mode.
Figure 12:
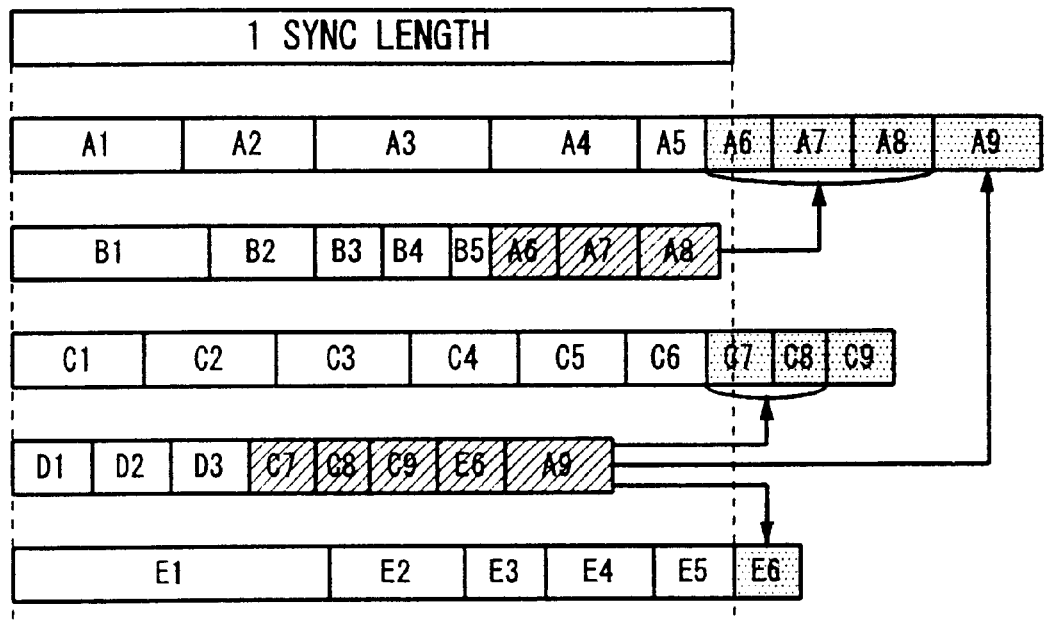
FIG. 12 is a schematic diagram showing an unpacking process in the normal reproducing mode.
Figure 13:
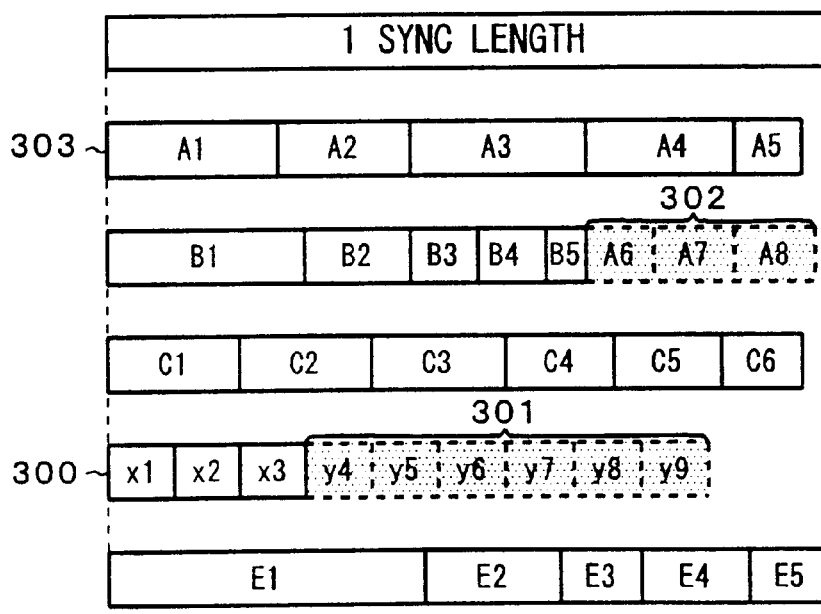
FIG. 13 is a schematic diagram for explaining that a particular packing unit mixes with data elements of sync blocks of another packing unit in an unpacking process.

As described above, in a high speed reproducing mode, the magnetic head traces a plurality of tracks at a time (see FIGS. 9 to 11). Thus, a packing unit composed of five sync blocks may mix with a data element of a sync block of another packing unit. This tendency becomes stronger as the reproducing speed increases. When sync blocks of other packing units mix, the BRR decoder 11 incorrectly decodes data.

As shown in FIG. 9, in the high speed reproducing mode of 2-times speed, since the magnetic head 7 traces two tracks with the same azimuth angle at a time, it can be expected that 250 sync blocks/2 tracks (=125 sync block/track) will be successively read. Thus, the probability of which data of each packing unit composed of five sync blocks is obtained is high. Thus, when each packing unit composed of five sync blocks is decoded, an image in high quality can be obtained.

As shown in FIG. 10, in the high speed reproducing mode of 10-times speed, since the magnetic head 7 traces 10 tracks with the same azimuth angle at a time, it can be expected that 250 sync blocks/10 tracks (=25 sync blocks/track) will be successively read. Thus, in this case, the probability of which data of each packing unit composed of five sync blocks is obtained is high. Since data of each packing unit containing high frequency components is decoded, an image in high quality is obtained.

On the other hand, in a high speed reproducing mode (for example, in the high speed reproducing mode of 50-times speed), the probability of which data of each packing unit composed of five sync blocks is read is low. When data of each packing unit is decoded, the data is incorrectly decoded.

On the other hand, for example, in the high speed reproducing mode of 50-times speed, since the probability of which the magnetic head 7 traces 50 tracks with the same azimuth angle at a time, it is expected that 250 sync blocks/50 tracks (=5 sync blocks/track) are successively read. However, the probability of which data of each packing unit is obtained is low. In this case, when the above-described inhibiting circuit is activated, the obtained data becomes full of error data. Thus, an image in low quality is obtained. In addition, in a high speed reproduction mode, the image updating ratio becomes low.

Thus, in this case, the packing unit mixture inhibiting circuit according to the present invention is deactivated. As with the conventional method, data of high frequency components that are temporarily placed in other sync blocks are discarded. Data of each sync block containing only low frequency components is decoded. In this case, although the image quality of the resultant image is lower than the image containing high frequency components, the image quality is higher than the case that data of each packing unit is improperly decoded. In addition, the image updating ratio becomes high.

Figure 29:
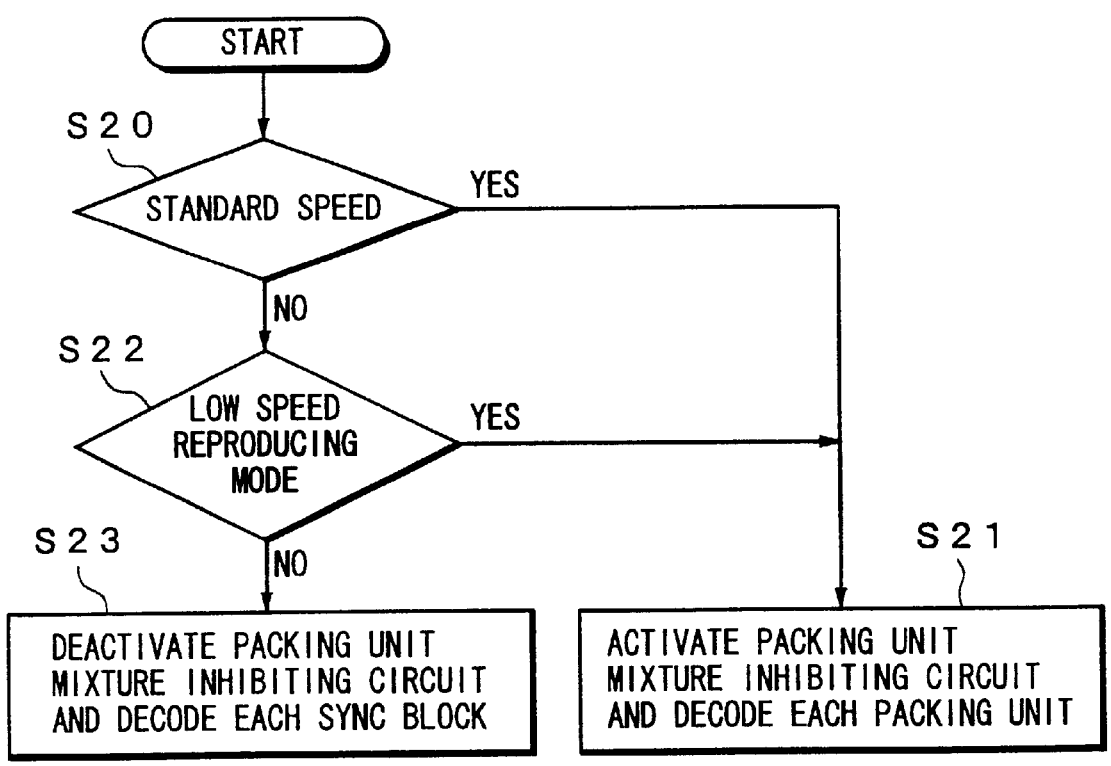
FIG. 29 is a flow chart showing a controlling process of a packing unit mixture inhibiting circuit corresponding to a reproducing speed.

FIG. 29 is a flow chart showing a controlling process of the packing unit mixture inhibiting circuit corresponding to a reproducing speed. In this flow chart, the process is branched corresponding to a reproducing speed. At step S20, it is determined whether or not the reproducing speed is the standard speed that is the same as the recording speed. When the determined result at step S20 is Yes, the flow advances to step S21. At step S21, the packing unit mixture inhibiting circuit is enabled. Thus, the BRR decoder 11 decodes data of each packing unit.

When the determined result at step S20 is No (namely, the reproducing speed is not the standard speed), the flow advances to step S22. At step S22, it is determined whether the reproducing speed is less than a predetermined threshold value. When the determined result at step S22 is Yes (namely, the reproducing speed is equal to or lower than the predetermined threshold value), the flow advances to step S21. On the other hand, when the determined result at step S22 is No (namely, the reproducing speed is higher than the predetermined threshold value), the flow advances to step S23. At step S23, the packing unit mixture inhibiting circuit is deactivated. Thus, the BRR decoder 11 decodes data of each sync block.

The threshold value is defined corresponding to a real reproduction image. In this example, the threshold value is set to 10-times speed. When the reproducing speed exceeds 10-times speed, it is determined that the reproducing mode is a high speed reproducing mode. When the reproducing speed does not exceed 10-times speed, it is determined that the reproducing mode is a low speed reproducing mode.

In the above description, one packing unit is composed of five sync blocks. However, according to the present invention, the number of sync blocks that compose one packing unit is not limited to five. In other words, even if one packing unit is composed of any number of sync blocks, as with the structure of which a packing unit is prevented from mixing with a data element of a sync block of another packing unit, an image in high quality can be obtained in a high speed reproducing mode.

As described above, according to the present invention, in the structure for decompressing video data that has been compressed and encoded as packing units each of which is composed of a plurality of sync blocks, a packing unit of data written to the SDRAM connected to the inner code/outer code decoder is compared with a packing unit of data that is read from the SDRAM. Thus, a packing unit is inhibited from mixing with a data element of a sync block of another packing unit. Consequently, even if five sync blocks that compose a packing unit cannot be correctly obtained as in a high speed reproducing mode, the BRR decoder disposed downstream of the inner code/outer code decoder does not perform the decompressing process with a packing unit that mixes with a data element of a sync block of another packing unit. Thus, when data is reproduced in a high speed reproducing mode, an image with high quality can be obtained.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A digital video signal processing apparatus for reproducing video data that has been compressed and encoded for each block, for processing the encoded data, and for packing the encoded data of a predetermined number of sync blocks as a unit in such a manner that encoded data that cannot be placed in one sync block is placed in another sync block of the unit, the apparatus comprising:

detecting means for detecting whether each unit of reproduction data mixes with a sync block of another unit;

unpacking means for restoring encoded video data placed in another sync block to the original sync block when a current unit does not mix with a sync block of another unit and for invalidating sync blocks when the current unit mixes with a sync block of the another unit;

decoding means for decoding each sync block of encoded video data that is output from said unpacking means; and determining means for determining whether a probability that the current unit mixes with a sync block of another unit is high or low, wherein said decoding means is activated when the probability determined by said determining means is low, and wherein said decoding means is not activated and the sync block of the other unit is discarded when the probability determined by said determining means is high.

2. A digital video signal processing apparatus for reproducing video data that has been compressed and encoded with an error correction code for each block, for processing the encoded data, and for placing the encoded data of a predetermined number of sync blocks as a unit in such a manner that encoded data that cannot be placed in one sync block is placed in another sync block of the unit, the apparatus comprising:

error correcting means for performing an error correcting process on reproduced video data;

a memory for storing video data that has been error-corrected by said error correcting means;

memory controlling means for receiving video data to be written to said memory and data that is read from said memory and performing an access controlling process for said memory;

detecting means for detecting whether a current unit mixes with a sync block of another unit corresponding to the video data supplied to said memory controlling means, the video data that is written to said memory, and the video data that is read from said memory;

unpacking means for restoring encoded video data placed in another sync block to the original sync block when the current unit does not mix with a sync block of another unit and for invalidating sync blocks when the current unit mixes with a sync block of the another unit;

decoding means for decoding each sync block of encoded video data that is output from said unpacking means; and determining means for determining whether a probability that the current unit mixes with a sync block of another unit is high or low, wherein said decoding means is activated when the probability determined by said determining means is low, and wherein said decoding means is not activated and the sync block of the other unit is discarded when the probability determined by said determining means is high.

3. The digital video signal processing apparatus as set forth in claim 2, wherein a sync block of a unit that is different from a unit having a sync block that is being read is not written to said memory.

4. The digital video signal processing apparatus as set forth in claim 2, wherein before a sync block of a new unit is written to said memory, error flags are set to positions of addresses of said memory corresponding to a plurality of sync blocks of the new unit.

5. The digital video signal processing apparatus as set forth in claim 2, wherein a determined probability of said determining means depends on a reproducing speed used to reproduce the digital video data from a magnetic tape.

6. The digital video signal processing apparatus as set forth in claim 2, wherein said error correcting means decodes the error correction code as a product code to perform the error correcting process, and wherein said error correcting means performs only an inner code error correcting process when a reproducing speed used to reproduce the digital video data from a magnetic tape is higher than a predetermined speed.

7. A digital video signal reproducing apparatus having a digital video signal processing apparatus for reproducing video data that has been compressed and encoded for each block, for processing the encoded video data, and for packing the encoded video data of a predetermined number of sync blocks as a unit in such a manner that encoded video data that cannot be placed in one sync block is placed in another sync block of the unit, the digital video signal reproducing apparatus comprising:

detecting means for detecting whether each unit of reproduced video data mixes with a sync block of another unit;

unpacking means for restoring the encoded video data placed in another sync block to an original sync block when a current unit does not mix with a sync block of another unit and for invalidating sync blocks when the current unit mixes with a sync block of the another unit;

decoding means for decoding each sync block of encoded video data that is output from said unpacking means; and determining means for determining whether a probability that the current unit mixes with a sync block of another unit is high or low, wherein said decoding means is activated when the probability determined by said determining means is low, and wherein said decoding means is not activated and the sync block of the other unit is discarded when the probability determined by said determining means is high.

8. A digital video signal reproducing apparatus having a digital video signal processing apparatus for reproducing video data that has been compressed and encoded with an error correction code for each block, for processing the encoded video data, and for packing the encoded video data of a predetermined number of sync blocks as a unit in such a manner that encoded video data that cannot be placed in one sync block is placed in another sync block of the unit, the digital video signal reproducing apparatus comprising:

error correcting means for performing an error correcting process on reproduced video data;

a memory for storing video data that has been error-corrected by said error correcting means;

memory controlling means for receiving video data to be written to said memory and data that is read from said memory and performing an access controlling processing for said memory;

detecting means for detecting whether a current unit mixes with a sync block of another unit corresponding to the video data supplied to said memory controlling means, the data that is written to said memory, and the data that is read from said memory;

unpacking means for restoring encoded video data placed in another sync block to the original sync block when the current unit does not mix with a sync block of another nit and for invalidating sync blocks when the current unit mixes with a sync block of the another unit;

decoding means for decoding each sync block of encoded video data that is output from said unpacking means; and determining means for determining whether a probability that the current unit mixes with a sync block of another unit is high or low, wherein said decoding means is activated when the probability determined by said determining means is low, and wherein said decoding means is not activated and the sync block of the other unit is discarded when the probability determined by said determining means is high.

9. A digital video signal processing method for reproducing video data that has been compressed and encoded for each block, for processing the enclosed video data, and for packing the encoded video of a predetermined number of sync blocks as a unit in such a manner that encoded video data that cannot be placed in one sync block is placed in another sync block of the unit, the method comprising the steps of:

(a) detecting whether each unit of reproduced video data mixes with a sync block of another unit;

(b) restoring encoded video data placed in another sync block to an original sync block when a current unit does not mix with a sync block of another unit and for invalidating sync blocks when the current unit mixes with a sync block of the another unit;

(c) decoding each sync block of digital video data that is output in the step of restoring; and (d) determining means for determining whether a probability that the current unit mixes with a sync block of another unit is high or low, wherein said decoding means is activated when the probability determined by said determining means is low, and wherein said decoding means is not activated and the sync block of the other unit is discarded when the probability determined by said determining means is high.

10. A digital video signal processing method for reproducing video data that has been compressed and encoded with an error correction code for each block, for processing the encoded video data, and for packing the encoded video data of a predetermined number of sync blocks as a unit in such a manner that encoded video data that cannot be placed in one sync block is placed in another sync block of the unit, the method comprising the steps of:

(a) performing an error correcting process on reproduced video data;

storing video data that has been error-corrected in the step of performing an error correcting process;

(c) receiving video data to be written to the memory and video data that is read from the memory and performing an access controlling process for the memory;

(d) detecting whether a current unit mixes with a sync block of another unit corresponding to the video data supplied in the step of receiving, the video data that is written to the memory, and the video data that is read from the memory;

(e) restoring encoded video data placed in another sync block to an original sync block when the current unit does not mix with a sync block of another unit and for invalidating sync blocks when the current unit mixes with a sync block of the another unit;

(f) decoding each sync block of digital video data that is output in the step of restoring; and (g) determining means for determining whether a probability that the current unit mixes with a sync block of another unit is high or low, wherein said decoding means is activated when the probability determined by said determining means is low, and wherein said decoding means is not activated and the sync block of the other unit is discarded when the probability determined by said determining means is high.

* * * * *